(12) United States Patent
Hirata et al.

(10) Patent No.: US 7,581,750 B2
(45) Date of Patent: Sep. 1, 2009

(54) AIRBAG DEVICE FOR ROLLOVER COUNTERMEASURE OF VEHICLE

(75) Inventors: Motoharu Hirata, Hiroshima (JP); Akihiro Kobayashi, Hiroshima (JP)

(73) Assignee: Mazda Motor Corporation (JP)

( * ) Notice: Subject to any disclaimer, the term of this patent is extended or adjusted under 35 U.S.C. 154(b) by 482 days.

(21) Appl. No.: 11/291,835

(22) Filed: Dec. 2, 2005

(65) Prior Publication Data
US 2006/0138754 A1   Jun. 29, 2006

(30) Foreign Application Priority Data

| Dec. 28, 2004 | (JP) | ............................. 2004-379615 |
| Jan. 12, 2005 | (JP) | ............................. 2005-004680 |
| Aug. 24, 2005 | (JP) | ............................. 2005-241957 |

(51) Int. Cl.
*B60R 21/16*   (2006.01)

(52) U.S. Cl. .................. 280/730.1; 280/730.2; 280/735; 280/736; 280/743.1

(58) Field of Classification Search ............. 280/730.1, 280/730.2, 735, 736, 743.1
See application file for complete search history.

(56) References Cited

U.S. PATENT DOCUMENTS

| 5,988,735 | A  | * | 11/1999 | Muller ........................ 296/214 |
| 6,457,740 | B1 | * | 10/2002 | Vaidyaraman et al. ... 280/730.2 |
| 6,695,342 | B2 | * | 2/2004  | Tanase et al. ............ 280/730.2 |
| 6,824,164 | B2 | * | 11/2004 | Pywell ..................... 280/730.2 |
| 6,846,010 | B2 | * | 1/2005  | Enders ..................... 280/730.2 |
| 6,913,280 | B2 | * | 7/2005  | Dominissini et al. ..... 280/728.2 |
| 7,237,798 | B2 | * | 7/2007  | Mori et al. ............... 280/730.1 |
| 7,364,185 | B2 | * | 4/2008  | Mori et al. ............... 280/730.1 |
| 2002/0175504 | A1 | * | 11/2002 | Tanase et al. ............ 280/730.2 |
| 2004/0239083 | A1 |   | 12/2004 | Mori et al. |
| 2006/0214401 | A1 | * | 9/2006  | Hirata ..................... 280/730.1 |

FOREIGN PATENT DOCUMENTS

| DE | 10115064   | 11/2002 |
| EP | 1386791    | 2/2004  |
| JP | 07-186870  | 7/1995  |
| JP | 07186870   | 7/1995  |
| JP | 2001-328503 | 11/2001 |
| JP | 2001328503  | 11/2001 |

OTHER PUBLICATIONS

European Search Report, Mar. 3, 2006.

* cited by examiner

*Primary Examiner*—Toan C To
(74) *Attorney, Agent, or Firm*—Studebaker & Brackett PC; Donald R. Studebaker

(57) ABSTRACT

A rear window curtain airbag device comprises an airbag placed at the portion near the upper edge of the rear window, an inflator to inject gas for the airbag, and a connecting pipe to supply the gas injected from the inflator to the airbag. Accordingly, the passenger's protection can be further improved by properly preventing part of the passenger's body from getting out of the rear window when the vehicle having the rear window being located above the seat back is rolled over.

12 Claims, 29 Drawing Sheets

Vehicle Front ←

AIRBAG DEVICE FOR ROLLOVER COUNTERMEASURE OF VEHICLE

BACKGROUND OF THE INVENTION

The present invention relates to an airbag device for rollover countermeasure of a vehicle, in particular to the airbag device for rollover countermeasure of a vehicle, such as a sports car, in which a rear window is substantially located above a seat back.

Conventionally, an airbag device for rollover countermeasure of a vehicle is known, in which there is provided an inflatable airbag for protecting a passenger that is placed at a portion near an edge of the rear window in its folded state and the airbag is inflated in a curtain shape so as to prevent part of passenger's body from getting out of a side window of the vehicle when the vehicle is rolled over.

For example, Japanese Patent Application Laid-Open No. 2001-328503 discloses the curtain airbag device for rollover countermeasure to protect the passenger in which there is provided the inflatable airbag that is placed at the pillar near the peripheral edge of the side window and the side rail in its folded state and the airbag is inflated in the curtain shape so as to be located inside the side window when the vehicle is rolled over.

Meanwhile, there are some types of vehicles, such as the sports car, which have a rear window that slants gently so as to provide a low vehicle height and thereby a low air resistance.

In this constitution, the rear window extends to the portion above the seat back and the head of the passenger is located below the rear window.

In this situation, however, there is a high likelihood that part of the passenger's body gets out of the rear window when the vehicle is rolled over.

The curtain airbag device disclosed in the above-described patent publication can not deal with this problem properly because the airbag is located just at the peripheral edge near the side window in its folded state.

Meanwhile, Japanese Patent Application Laid-Open No. 7-186870 discloses the airbag device in which the airbag located at the rear package tray is inflated toward the vehicle front at the vehicle rear crash. However, this device does not provide any proper countermeasure against the phenomenon that part of the passenger's body would get out of the rear window.

SUMMARY OF THE INVENTION

The present invention has been devised in view of the above-described problem, and an object of the present invention is to provide the airbag device for rollover countermeasure of a vehicle that can improve the passenger's protection further by properly preventing part of the passenger's body from getting out of the rear window when the vehicle having the rear window being located above the seat back is rolled over.

According to the present invention, there is provided an airbag device for rollover countermeasure of a vehicle, in which a rear window is substantially located above a seat back in a use position of a seat that is disposed in a cabin, comprising a rollover judging device operative to judge a vehicle rollover by detecting or predicting the vehicle rollover, and an inflatable airbag, the airbag being placed at a portion near an edge of the rear window in a folded state thereof, wherein the airbag is configured so as to be inflated toward the rear window in a curtain shape from the portion near the edge of the rear window when the vehicle rollover is judged by the rollover judging device.

According to this structure, when the vehicle rollover is judged by the rollover judging device, the inflatable airbag placed at the portion near the edge of the rear window is inflated toward the rear window in the curtain shape.

Thereby, even in the vehicle having the rear window substantially located above the seat back, the airbag inflated in the curtain shape is properly located inside the rear window, so that part of the passenger's body can be prevented from getting out of the rear window when the vehicle rollover is detected or predicted.

Herein, the above-described rollover judging device includes any types of judging means, in which, for example, the vehicle rollover is judged by detecting a roll angle of the vehicle or an acceleration applied to the vehicle, or the vehicle rollover is predicted by detecting a vehicle speed or a steering angle.

According to an embodiment of the present invention, the airbag is placed at a portion near an upper edge of the rear window, and the airbag is configured so as to be inflated toward a vehicle rear along the rear window from the portion near the upper edge of the rear window.

According to this structure, the inflatable airbag placed at the portion near the upper edge of the rear window is inflated toward the vehicle rear along the rear window. Thereby, the airbag inflated in the curtain shape can be surely located inside the rear window, and thus part of the passenger's body can be more properly prevented from getting out of the rear window when the vehicle rollover is detected or predicted.

Herein, the portion near the upper edge of the rear window where the airbag is located includes any portion that is located on the upper side of the rear window, including an edge portion of the rear window or a rear header.

According to another embodiment of the present invention, the airbag comprises an attaching portion at both sides thereof in a vehicle width direction that attaches the both sides of airbag to a portion near both side edges of the rear window, and the airbag is configured so as to be inflated to a position that is located behind an upper end of the seat back.

According to this structure, since the airbag comprises the attaching portion at its both sides in the vehicle width direction that attaches the both sides of airbag to the portion near both side edges of the rear window, the airbag is attached to the portion near the both side edges of the rear window in the inflated state. And, the airbag is inflated to the position that is located behind the upper end of the seat back.

Thus, the airbag can cover the whole width of the rear window and the longitudinal area of the rear window to the position that is located behind the upper end of the seat back.

Thereby, the upper area of the passenger in the seat can be covered by the airbag inflated, so the passenger protection can be surely attained when the vehicle is rolled over.

According to another embodiment of the present invention, the airbag comprises the attaching portion at both sides thereof in the vehicle width direction that attaches the both sides of airbag to the portion near both side edges of the rear window, and an inflating portion to be inflated by supply gas, the inflating portion is comprised of a plurality of parts that extend downward from an upper end portion of the airbag so as to be located in the vehicle width direction, and a gas supply portion is provided at around the center of the upper end portion of the airbag.

According to this structure, since the inflating portion is comprised of a plurality of parts extending downward from the upper end portion of the airbag so as to be located in the vehicle width direction, the gas can be supplied promptly to the lower portion of the airbag and thereby the airbag can be inflated quickly. Also, since the gas supply portion is provided at around the center of the upper end portion of the airbag, the gas can be supplied into the airbag promptly and widely, without deviating toward one side, so as to inflate the airbag uniformly and quickly.

Thus, the whole airbag can be inflated quickly and surely.

Thereby, the airbag can be quickly inserted into the narrow gap between the passenger's head and the rear window and thus inflated surely.

According to another embodiment of the present invention, the airbag comprises the attaching portion at both sides thereof in the vehicle width direction that attaches the both sides of airbag to the portion near both side edges of the rear window, and at least one inflating portion to be inflated by supply gas, and the inflating portion is configured such that when being inflated, a vertical-direction thickness of a portion thereof located behind an upper end of the seat back is smaller than that of a portion thereof located in front of the upper end of the seat back.

According to this structure, the inflating portion of the airbag is inflated in such a manner that when being inflated, the vertical-direction thickness of its portion located behind the upper end of the seat back is smaller than that of its portion located in front of the upper end of the seat back.

Thus, as the airbag is inflated, the rear-side portion corresponding to an inflating-front end of the airbag is not inflated widely. Thereby, the interference of the airbag with the passenger' head can be avoided properly and thus the airbag can be smoothly inflated rearward. Meanwhile, the front-side portion of the inflating portion has a specified vertical-direction thickness enough to properly absorb the hitting impact of the passenger even if the passenger's body is moved upward.

Thereby, the airbag can be quickly inserted into the narrow gap between the passenger's head and the rear window, and the hitting impact of the passenger moved upward can be absorbed properly.

According to another embodiment of the present invention, the airbag comprises the attaching portion at both sides in the vehicle width direction that attaches the both sides of airbag to the portion near both side edges of the rear window, and at least one inflating portion to be inflated by supply gas, and at least a rear part of the inflating portion is configured such that when being inflated, a vertical-direction thickness of lateral side portions thereof corresponding to passenger-sitting positions is relatively small, whereas a vertical-direction thickness of a central portion thereof corresponding to the center of vehicle is relatively large.

According to this structure, the rear part of the inflating portion is inflated in such a manner that when being inflated, the vertical-direction thickness of its lateral side portions corresponding to passenger-sitting positions is relatively small and the vertical-direction thickness of its central portion corresponding to the center of vehicle is relatively large.

Thus, since the airbag is inflated with the relatively large vertical-direction thickness of its central portion and with the relatively small vertical-direction thickness of its lateral side portions, the width-direction length is made short and thereby a large tension can be provided at the airbag in the vehicle width direction.

Thereby, the airbag can be quickly inserted into the narrow gap between the passenger's head and the rear window, and the large tension can be surely provided at the airbag in the vehicle width direction.

According to another embodiment of the present invention, there is provided a seatbelt device comprising a tension applying device to apply a tension to a belt for restraining a torso of a passenger, and the tension applying device of the seatbelt device is configured so as to operate prior to an inflation of the airbag when the vehicle rollover is judged by the rollover judging device.

According to this structure, the tension applying device of the seatbelt device operates prior to the inflation of the airbag when the vehicle rollover is judged by the rollover judging device.

Thus, since the passenger's torso is restrained by the seatbelt in an early stage of the vehicle rollover or the prediction of the vehicle rollover, the passenger can be prevented from being moved upward and thus the airbag can be surely inserted into the narrow gap between the passenger's head and the rear window.

Thereby, the airbag can be surely placed above the passenger's head, so that the passenger's protection can be surely attained.

According to another embodiment of the present invention, the airbag is placed at a portion near a lower edge of the rear window, and the airbag is configured so as to be inflated toward a vehicle front along the rear window from the portion near the upper edge of the rear window.

According to this structure, when the vehicle rollover is judged by the rollover judging device, the inflatable airbag placed at the portion near the lower edge of the rear window is inflated toward the vehicle front along the rear window in the curtain shape.

Thereby, even in the vehicle having the rear window substantially located above the seat back, the airbag inflated in the curtain shape is properly located inside the rear window with tension, so that part of the passenger's body can be prevented from getting out of the rear window when the vehicle rollover is detected or predicted.

Herein, the portion near the lower edge of the rear window where the airbag is located includes any portion that is located on the lower side of the rear window, including an edge portion of the rear window, a rear package tray, or a cross member supporting a lower end of the rear window.

Herein, although the inflated airbag located inside the rear window has an appropriate degree of tension that is produced by inflation force, an additional tension created by another tensioner device may be also applied to the airbag.

According to another embodiment of the present invention, the airbag comprises the attaching portion at both sides thereof in the vehicle width direction that attaches the both sides of airbag to the portion near both side edges of the rear window, and the airbag is configured so as to be inflated from the position that is above the upper end of the seat back to a position that is on a vehicle front side.

According to this structure, since the airbag comprises the attaching portion at its both sides in the vehicle width direction that attaches the both sides of airbag to the portion near both side edges of the rear window, the airbag is attached to the portion near the both side edges of the rear window in the inflated state. And, the airbag is inflated from the position above the upper end of the seat back to the position that is on the vehicle front side.

Thus, the airbag can cover the whole width of the rear window and the longitudinal area of the rear window from the position above the upper end of the seat back to the position that is on the vehicle rear side.

Thereby, an upper area of the passenger in the seat can be covered by the airbag inflated, so the passenger protection can be surely attained when the vehicle is rolled over.

According to another embodiment of the present invention, the airbag comprises the attaching portion at both sides thereof in the vehicle width direction that attaches the both sides of airbag to the portion near both side edges of the rear window, and at least one inflating portion to be inflated by supply gas, and the inflating portion is configured such that when being inflated, the vertical-direction thickness of the portion thereof located in front of the upper end of the seat back is larger than that of the portion thereof located behind the upper end of the seat back.

According to this structure, the inflating portion of the airbag is inflated in such a manner that the vertical-direction thickness of the portion located forward is larger than that of the portion located rearward.

Thus, the forward-located portion of the inflating portion has the large thickness in the vertical direction. Thereby, even if passenger's body is moved upward when the vehicle is rolled over, the hitting impact of the passenger moved upward can be surely absorbed.

Further, this large thickness of the forward-located portion of the inflating portion can provide the upper end portion (namely, the front end portion) of the airbag with the proper tension in the vehicle width direction.

Thus, the hitting impact of the passenger moved upward can be absorbed, and since the tension can be provided at the upper end portion of the airbag, the appropriate tension can be provided at the whole part of airbag properly.

According to another embodiment of the present invention, the airbag comprises the attaching portion at both sides thereof in the vehicle width direction that attaches the both sides of airbag to the portion near both side edges of the rear window, and at least one inflating portion to be inflated by supply gas, and the inflating portion is configured such that when being inflated, the vertical-direction thickness of lateral side portions thereof corresponding to passenger-sitting positions is relatively small, whereas the vertical-direction thickness of the central portion thereof corresponding to the center of vehicle is relatively large.

According to this structure, the rear part of the inflating portion is inflated in such a manner that when being inflated, the vertical-direction thickness of its lateral side portions corresponding to passenger-sitting positions is relatively small and the vertical-direction thickness of its central portion corresponding to the center of vehicle is relatively large.

Thus, since the airbag is inflated with the relatively large vertical-direction thickness of its central portion and with the relatively small vertical-direction thickness of its lateral side portions, the vertical-direction inflation can be made larger and thereby the appropriate tension can be provided in the vehicle width direction.

Thereby, the airbag can be inserted into the narrow gap between the passenger's head and the rear window, and the tension can be surely provided at the airbag in the vehicle width direction.

According to another embodiment of the present invention, the inflating portion of the airbag comprises the central portion located at the vehicle center and the side portion located above passenger-sitting positions, and the gas supply to the airbag is configured such that the gas is supplied to the side portion first and then to the central portion.

According to this structure, when the airbag is inflated, at first the gas is supplied to the side portion of the inflating portion that is located above the passenger-sitting positions, and then the gas is supplied to the central portion of the inflating portion.

Thus, in the early stage of the vehicle rollover or the prediction of the vehicle rollover, the airbag starts to be inflated from the side, so that the airbag can be surely inserted into the narrow gap between the passenger's head and the rear window.

Thereby, the airbag can be inflated more surely above the passenger, thereby further improving the passenger protection during the vehicle rollover.

According to another embodiment of the present invention, the airbag comprises a plurality of airbags that are placed at portions near lateral both edges of the rear window, and each airbag is configured so as to be inflated inward in the vehicle width direction along the rear window from the portion near the lateral edge of the rear window.

According to this structure, when the vehicle rollover is judged by the rollover judging device, a plurality of airbags placed at portions near lateral both edges of the rear window are inflated inward in the vehicle width direction along the rear window in the curtain shape.

Thereby, even in the vehicle having the rear window substantially located above the seat back, the airbags inflated in the curtain shape are properly located inside the rear window with tension, so that part of the passenger's body can be prevented from getting out of the rear window when the vehicle rollover is detected or predicted.

Herein, the portions near lateral both edges of the rear window where the airbags are located include any portion that is located on the lateral both sides of the rear window, including lateral both edge portions of the rear window, or lateral portions behind the cabin.

According to another embodiment of the present invention, the above-described each airbag is fixed to an upper-edge attaching portion located near an upper edge of the rear window, and comprises an inflating portion to be inflated by supply gas, and each inflating portion is configured so as to be inflated inward from the lateral edge of the rear window and the upper-edge attaching portion.

According to this structure, left and right inflating portions are inflated inward from the lateral edges of the rear window and the upper-edge attaching portion in the curtain shape.

Thereby, the upper edge of the rear window near the passenger's head can be surely covered by the airbags, and the inflating portion can be inflated promptly at the upper edge of the rear window.

Thus, part of the passenger's body can be prevented from getting out of the rear window further surely.

According to another embodiment of the present invention, the rear window includes a curved window pane, whose central portion at the upper edge projects toward a vehicle rear relative to lateral side portions thereof, and each airbag is configured so as to be inflated inward along the rear window.

According to this structure, the airbag is inflated at the portion which is behind and apart from the passenger's head.

Thereby, the interference of the airbag with the passenger's head can be avoided properly when the airbag is inflated.

Also, part of the passenger's body can be prevented from getting out of the rear window further surely, and an appearance of the rear window and the aerodynamic characteristic can be also improved.

According to another embodiment of the present invention, the airbags are configured so as to be inflated in such a manner that the both overlap near the upper edge of the rear window.

According to this structure, when the airbags are inflated respectively, they overlap in the vehicle longitudinal direction near the upper edge of the rear window.

Thereby, the central area of the rear window can be covered widely in the vertical direction by the inflated airbags.

Thus, part of the passenger's body can be prevented from getting out of the rear window further surely.

According to another embodiment of the present invention, an inflation timing of the airbags are configured so as to be different from each other.

According to this structure, when one of these airbags is in process of inflation or after it has been inflated, the other starts to be inflated.

Thereby, the airbags are prevented from improperly affecting inflation of each other, so respective airbags can be inflated quickly and surely.

Thus, part of the passenger's body can be prevented from getting out of the rear window further surely.

According to another embodiment of the present invention, the rear window includes a curved window pane, whose central portion at the upper edge projects toward a vehicle rear relative to lateral side portions thereof, the rollover judging device judges which side of the vehicle is lowered when the vehicle is rolled over, and the airbags are configured such that one of airbags located at the side that is judged to be lowered by the rollover judging device is inflated prior to the other airbag.

According to this structure, since the rear window is formed such that its central portion at the upper edge projects toward the vehicle rear relative to lateral side portions thereof, the distance between the passenger's head and a portion of the rear window that is located at the lower side at the vehicle rollover becomes short. Herein, the airbag located at this lower side is inflated first.

Thereby, the airbag can be inflated so as to be located surely and quickly between the passenger's head and rear window on this side.

Thus, part of the passenger's body can be prevented from getting out of the rear window further surely.

Other features, aspects, and advantages of the present invention will become apparent from the following description which refers to the accompanying drawings

Hereinafter, preferred embodiments of the present invention will be described referring to the accompanying drawings.

DETAILED DESCRIPTION OF THE INVENTION

Embodiment 1

Figure 1:
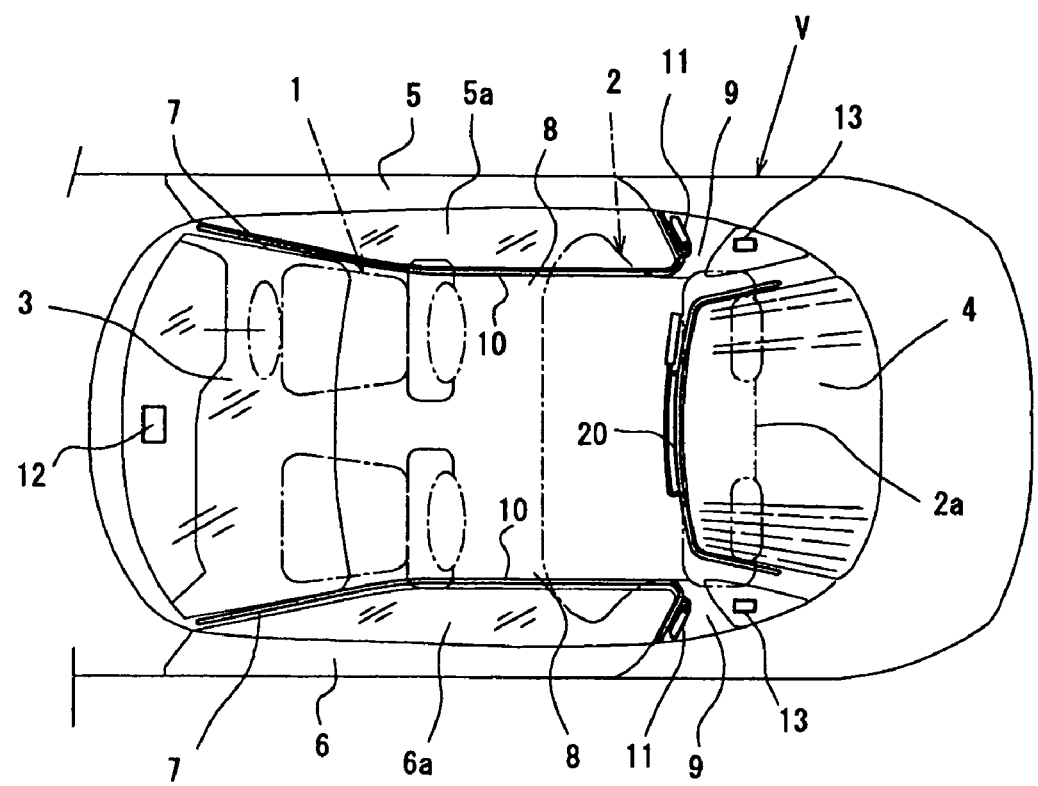
FIG. 1 is a schematic plan view of a vehicle equipped with a first embodiment of the present invention.

FIG. 1 is a schematic plan view of a vehicle equipped with an airbag device for rollover countermeasure of a vehicle of a first embodiment of the present invention. A vehicle V of the present embodiment is a four-passenger sports car that comprises a front seat 1 and a rear seat 2 in a cabin. A windshield 3 is provided at the front, and at the rear is provided a rear window 4 that comprises a curved window pane. A pair of side windows 5a, 6a are provided at upper portions of right and left doors 5, 6.

Further, inflatable airbags 10, 20 are placed at portions near upper edges of the side windows 5a, 6a respectively and the rear window 4, respectively. Each airbag is inflated when a vehicle rollover is detected or predicted.

The airbags 10, 10 placed at portions near upper edges of the side windows 5a, 6a are the ones of a side curtain airbag device. These airbags are inflated in a curtain shape inside the side windows 5a, 6a so as to prevent part of the passenger's body from getting out of the windows at the vehicle rollover or vehicle side crash.

The airbags 10, 10 are attached by attaching members, not illustrated, and provided so as to enclose the upper edges of the side windows 5a, 6a, extending from front A pillars 7, 7 to rear B pillars 9, 9 via side rails 8, 8 and being covered by trim members in the cabin (not illustrated).

Respective front and rear ends of the airbags 10, 10 are placed at respective lower ends of the A pillars 7, 7 and B pillars 9, 9 so as to provide a specified tension in a longitudinal direction at respective portions near lower edges (belt lines) of the side windows 5a, 6a when the airbags are inflated.

Cylindrical inflators 11, 11 operative to supply inflating gas to the airbags 10, 10 at the vehicle rollover and the like are placed within the B pillars 9, 9, with their longitudinal direction extending vertically.

The operation of this side curtain airbag device is controlled with a control flowchart, described later.

Meanwhile, the airbag 20 placed at the portion near upper edge of the rear window 4 are the one of a rear window curtain airbag device. This airbag is inflated in the curtain shape inside the rear window 4 so as to prevent part of the passenger's body from getting out of the window at the vehicle rollover or vehicle side crash.

Namely, in the sports car like the present embodiment, the rear window 4 tends to be disposed so as to slant gently to provide the low vehicle height and thereby the low air resistance. This slant disposition makes the rear window 4 be located above the seat back 2a in a use position of the rear seat 2.

Accordingly, when the vehicle is rolled over, there is a concern that part of the passenger would get out of the rear window 4 and thus the passenger could not be protected properly.

Herein, the present embodiment is configured such that the airbag 20 is placed at the portion near the upper edge of the rear window 4 to improve the passenger protection at the vehicle rollover. The specific structure thereof will be described below.

At a front-central portion in the cabin is provided a rollover detecting sensor 12 operative to detect the vehicle rollover. The rollover detecting sensor 12 is a roll-angle sensor that detects a roll angle (angle around a vehicle longitudinal axis) and a roll-angle speed of the vehicle. For example, that can be comprised of a sensor to detect the force occurring on a mass with revolution, such as a angle speed sensor, oscillating gyro, or gas rate gyro.

Herein, the rollover detecting sensor 12 may be comprised of a rollover predicting sensor to predict the vehicle rollover.

A seatbelt device 13 to restrain the rear passenger is provided at the rear seat 2. This seatbelt device 13 is a three-point seatbelt device including a pre-tensioner mechanism operative to apply a specified tension to the seat belt restraining the passenger's torso.

Figure 2:
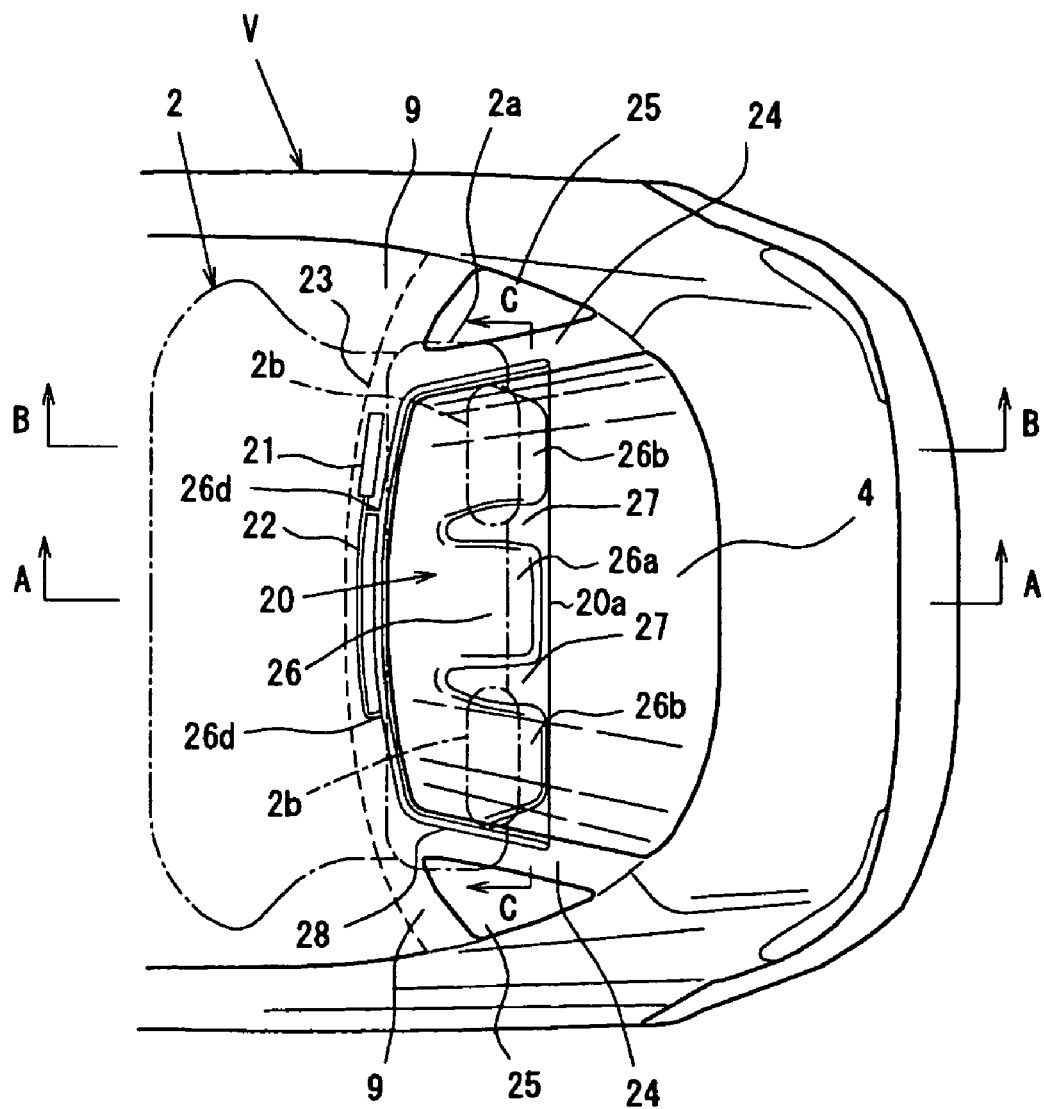
FIG. 2 is a specific plan view of a rear portion of the vehicle.
Figure 3:
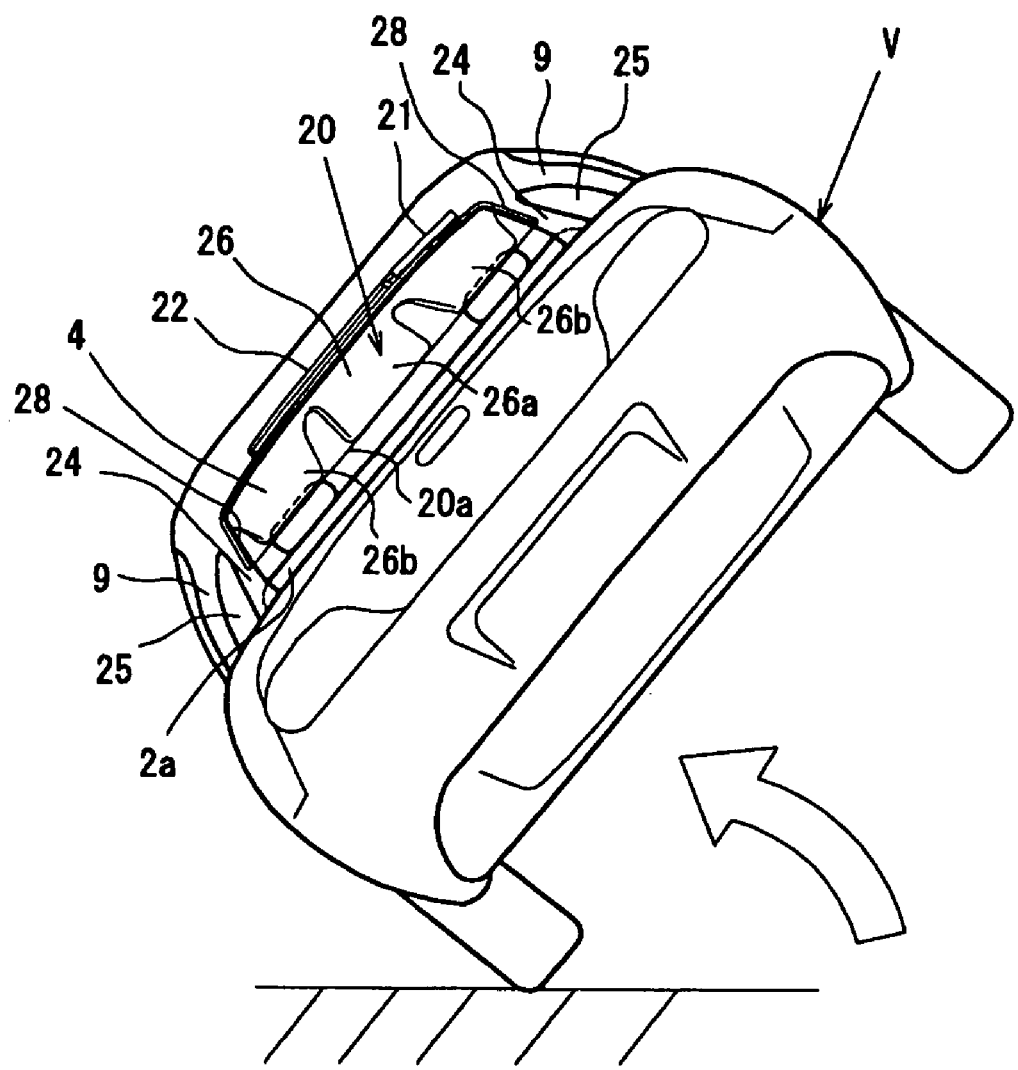
FIG. 3 is a rear view of the vehicle when a vehicle rollover is predicted.
Figure 4:
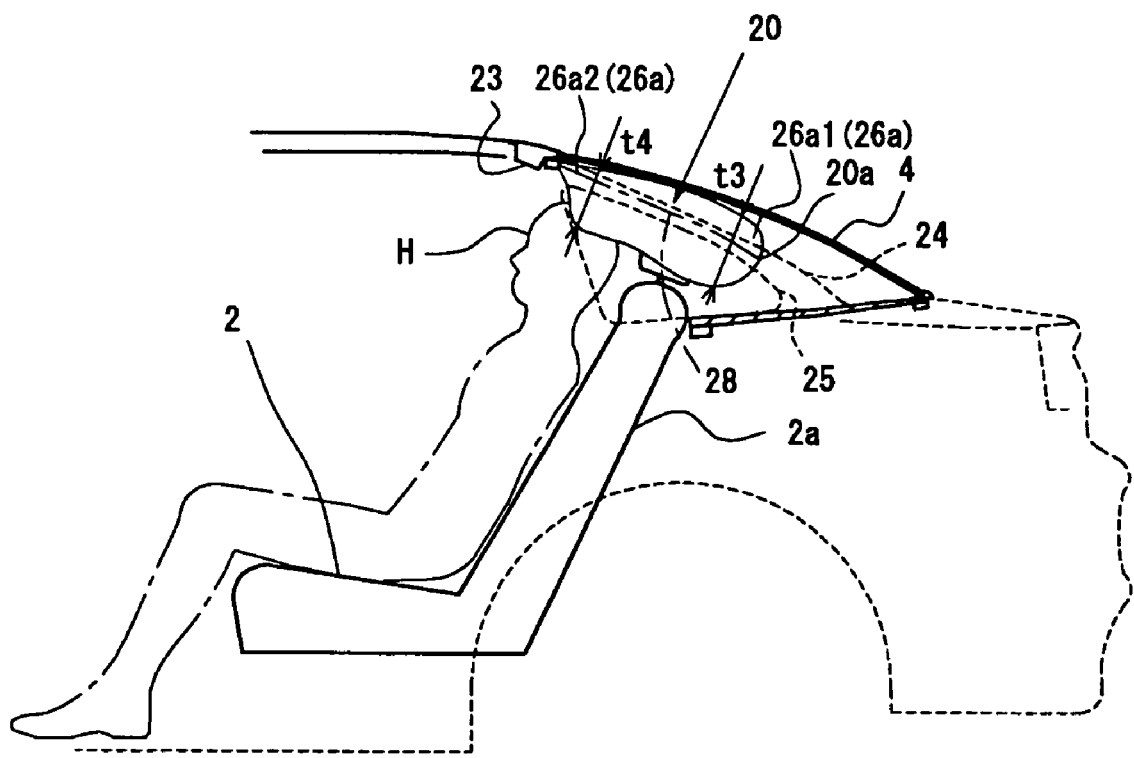
FIG. 4 is a sectional view taken along line A-A of FIG. 2.
Figure 5:
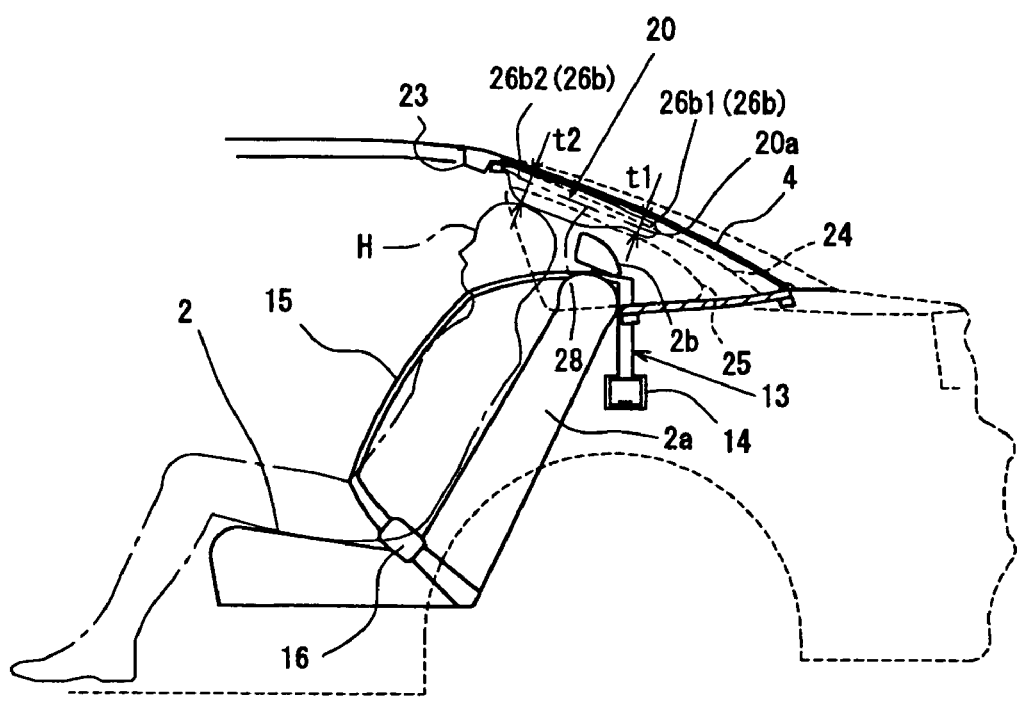
FIG. 5 is a sectional view taken along line B-B of FIG. 2.
Figure 6:
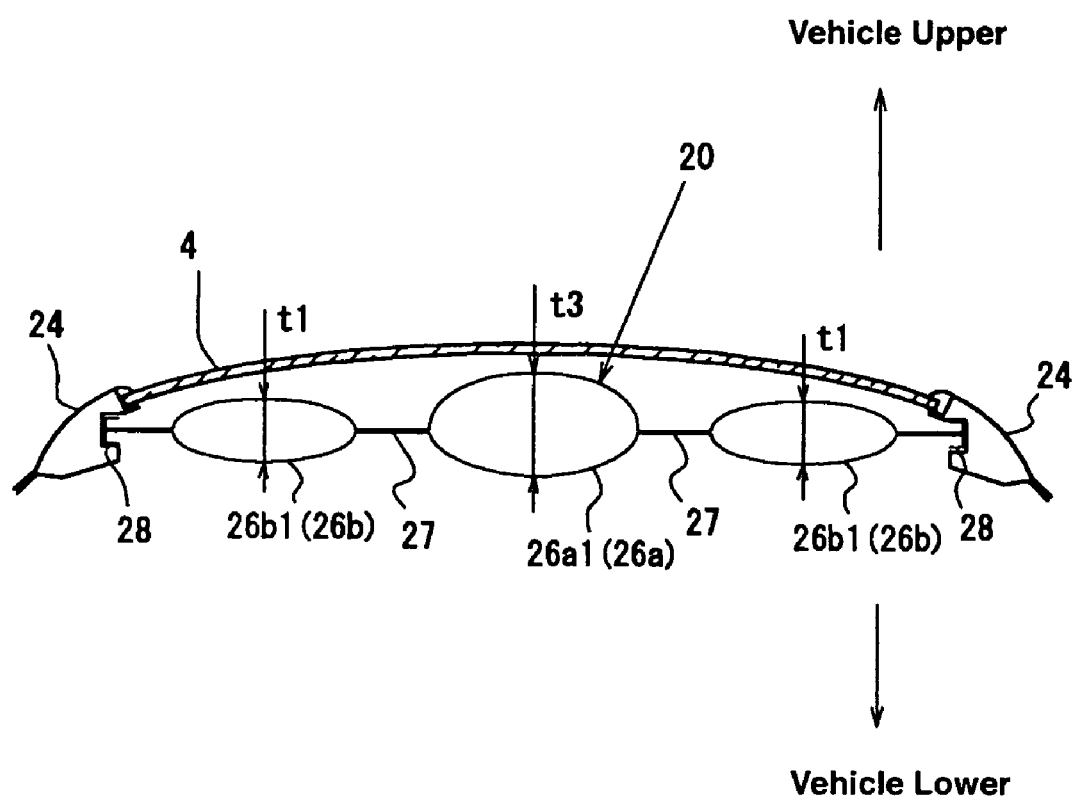
FIG. 6 is a sectional view taken along line C-C of FIG. 2.

Hereinafter, the specific structure of the rear-window curtain airbag device and others will be described referring to FIGS. 2 through 6. FIG. 2 is a specific plan view of a rear portion of the vehicle, FIG. 3 is a rear view of the vehicle when the vehicle rollover is predicted, FIG. 4 is a sectional view taken along line A-A of FIG. 2, FIG. 5 is a sectional view taken along line B-B of FIG. 2, and FIG. 6 is a sectional view taken along line C-C of FIG. 2.

The rear-window curtain airbag device of the present embodiment comprises the airbag placed at the upper edge of the rear window 4, an inflator 21 operative to inject inflating gas for the airbag 20, and a connecting pipe 22 to supply the gas injected by the inflator 21 to the airbag 20.

The airbag 20 is placed at the portion near the upper edge of the rear window 4. More specifically, it is placed in the folded state at the rear portion of a rear header 23 extending in the vehicle width direction at the rear end of a vehicle roof and at the rear ends of both C pillars 24 of the rear window 4, in substantially a U shape in the plan view.

Fixed-type of window panes 25 are provided between the B pillars 9 and the C pillars 24, respectively.

The airbag 20 is comprised of a canvas-made bag member in substantially a trapezoid shape in the plan view, which comprises an inflating portion 26 and a non-inflating portion that are connected to the upper edge of the rear window 4, and an attaching portion 28 that is connected to the C pillar 24.

When it is inflated, as illustrated in FIG. 2, the airbag 20 is inflated toward the vehicle rear so as to cover substantially a front-half portion of the rear window 4 (to a position that is located behind an upper end of the seat back 2a).

Thus, the airbag inflated in the curtain shape is located between the rear seat 2 and the rear window 4, so part of passenger's body can be prevented from getting out of the rear window 4 when the vehicle V is rolled over.

The airbag 20 is inflated not so as to cover the rear-half area of the rear window 4. Thus, the gas volume supplied by inflator 21 can be made small. Also, since the volume of the airbag 20 to be inflated is reduced, the airbag can be inflated promptly.

The inflating portion 26 comprises a central portion 26a that is inflated to be located at the center and extend downward from the upper end portion of the airbag 20, and side portions 26b, 26b that are inflated to be located both lateral sides and extend downward likewise. These portions 26a, 26b, 26b are connected to each other at the upper portion. The side portions 26b, 26b are located above the heads of the side-sitting passengers and the central portion 26a is located above the head of the center-sitting passenger.

Thus, the gas is quickly supplied to the lower end of the airbag 20, so the airbag 20 is inflated promptly.

Also, the inflating portion 26 includes gas supply ports 26d, 26d that are provided at two locations at the center of the upper end portion of the airbag (specifically, at locations above the headrests 2b, 2b). The gas from the inflator 21 are taken in the airbag 26 via these ports 26d, 26d.

Thereby, the gas can be supplied into the airbag 20 promptly and widely, without deviating toward one side.

As illustrated in FIG. 5, the vertical-direction thickness t1 of a portion of the side portions 26b, 26b of the inflating portion 26 that is located behind the upper end of the seat back 2a is relatively small, whereas the vertical-direction thickness t2 of a portion of the side portions 26b, 26b of the inflating portion 26 that is located in front of the upper end of the seat back 2a is relatively large.

According to this thickness setting of the side portions 26b of the inflating portion 26, as the airbag 20 is inflated, a rear-side portion 26b1 corresponding to a inflating-front end of the airbag is not inflated widely. Thereby, the interference of the airbag 20 with the passenger' head H can be avoided properly and the airbag can be smoothly inflated rearward.

Meanwhile, since a front-side portion 26b2 of the inflating portion 26 has a relatively large vertical-direction thickness, the hitting impact can be properly absorbed by this portion when the passenger's head H hits against the airbag 20.

This setting is particularly preferable in the case where the rear window 4 includes the curved window pane, whose central portion at the upper edge projects toward the vehicle rear relative to lateral side portions thereof. Because, in this case, the lateral side portions (portions corresponding to the headrests 2b in FIG. 2) of the rear window 4 are positioned lower than the central portion of the rear window 4. Namely, the distance between the passenger's head H and the lateral side portions of the rear window 4 becomes short, so the airbag 20 is required to be inserted surely between this narrow space.

Also, as illustrated in FIG. 4, the vertical-direction thickness t3 of a portion of the central portions 26a of the inflating portion 26 that is located behind the upper end of the seat back 2a is relatively large, and the vertical-direction thickness t4 of a portion of the central portion 26a of the inflating portion 26 that is located in front of the upper end of the seat back 2a is also relatively large.

According to this thickness setting of the central portion 26a of the inflating portion 26, the portion 26a1 corresponding to the inflating-front end of the airbag can be inflated widely at the center where the passenger is not located, and the large tension can be provided in the vehicle width direction at a lower end portion 20a of the airbag 20.

Herein, even in the case where the passenger sits in the center of the rear seat 2, the distance between the passenger's head and the rear widow 4 is larger than that between the head of the passenger sitting in the lateral sides of the rear seat 3 and the rear window (see FIG. 6) because the rear window 4 has the curved window pane. Thereby, the smooth inflation of the airbag 20 and the surely-providing tension at the lower end portion 20a of the airbag can be attained.

Also, since a front-side portion 26a2 has also a large thickness in the vertical direction, a hitting impact of the passengers who may be moved laterally at the vehicle rollover can be absorbed properly. And, the passenger sitting at the center of the rear seat can also be protected properly.

In the case where the rear window 4 is configured with the curved window pane like the present embodiment, enough spaces for the airbag inflation would not be provided at the lateral both sides. Accordingly, the inflating portion 26 is inflated largely at the center where large space may be easily provided, and thereby the proper tension can be provided in the vehicle width direction.

Namely, as illustrated in FIG. 6, the center portion of the rear widow 4 with the curved pane is located in the higher position than the lateral side portions of the rear window 4. Thus, the vertical-direction thickness t3 of the central portion 26a (26a1) can be set to be large.

Thereby, even if the vertical-direction thickness t1, t1 of the side portions 26b, 26b (26b1, 26b1) is small, the proper tension can be provided in the vehicle width direction at the lower end portion 20a of the airbag 20. Also, since the vertical-direction thickness t2, t4 are set at the front-side portions 26a2, 26b2 likewise, the proper tension can be provided in the vehicle width direction at the upper portion of the airbag 20.

Herein, the vertical-direction thickness t2, t4 of the central portion and side portions 26a2, 26b2 may be set to be relatively medium according to relationships of the space and the like.

The above-described non-inflating portions 27, 27 are located between these inflating portions 26a, 26b, 26b so as to stabilize the location of the respective inflating portions 26a, 26b, 26b and prevent the passengers from being moved upward. Also, the tension can be provided in the vehicle width direction at the airbag 20 by the non-inflating portions 27, 27.

Herein, the whole airbag 20 may be comprised of only the inflating portions having the above-described thickness, with no non-inflating portion.

The above-described attaching portion 28 is provided at the peripheral portion of the airbag 20 so as to attach the airbag 20 firmly to the upper peripheral edge of the rear window 4.

The lower end of the attaching portion 28 is attached to the lower portion of the C pillar 24, so the tension can be provided by the lower end portion 20a when the airbag 20 is inflated.

The above-described inflator 21 is disposed in the rear header 23 in such a manner that its longitudinal direction is along the vehicle width direction.

This inflator 21 is not a normal inflator, in which a gas generating material such as sodium azide is ignited by an igniting device to produce gas with a high temperature, but a low-temperature type of inflator in which compressed gas is accumulated and the accumulated gas with a low temperature (gas with a little higher temperature than the atmosphere's temperature) is released by opening a shut-off valve and supplied to the airbag 20.

This low-temperature type of inflator 21 would be useful to keep the airbag 20 inflated for a long period of time. Because the gas temperature is a relatively low and the gas is not cooled down so quickly by air in the cabin, and thus the gas volume does not shrink promptly.

The above-described connecting pipe 22 is disposed in the vehicle width direction along the rear header 23, one end of which is connected to an injection port of the inflator 21 and the other end of which is connected to the gas supply ports 26d, 26d of the airbag 20.

Since the gas is supplied from the connecting pipe 22 via two ports 26d, 26d located at the central portion of the airbag 20 as described above, the gas can be supplied quickly. Also, since the ports 26d, 26d are located just above the passenger's sitting positions, the airbag's portion above the passenger can be inflated promptly.

The seatbelt device 13 comprises, as illustrated in FIG. 5, a retractor device 14 with a pre-tensioner that is fixed to the vehicle body panel, a belt member 15 retraining the passenger's torso, and a buckle member 16.

This seatbelt device is a type in which a shoulder anchor (member to support an upper end of the belt member) is provided at the B pillar. This is not limited to this type, but another type, in which the retractor device is built in the seat back 2a, may be applied.

The pre-tensioner has a conventional structure, and so its detailed description is omitted here. It pulls the belt member 15 into the retractor device 14 when receiving an operational signal, thereby restraining the passenger's torso properly against the seat back 2a.

Herein, in order to increase a restraint force for the passenger, there may be further provided a lap pre-tensioner operative to pull the buckle member 16 downward, which may be operated together with the pre-tensioner.

Figure 7:
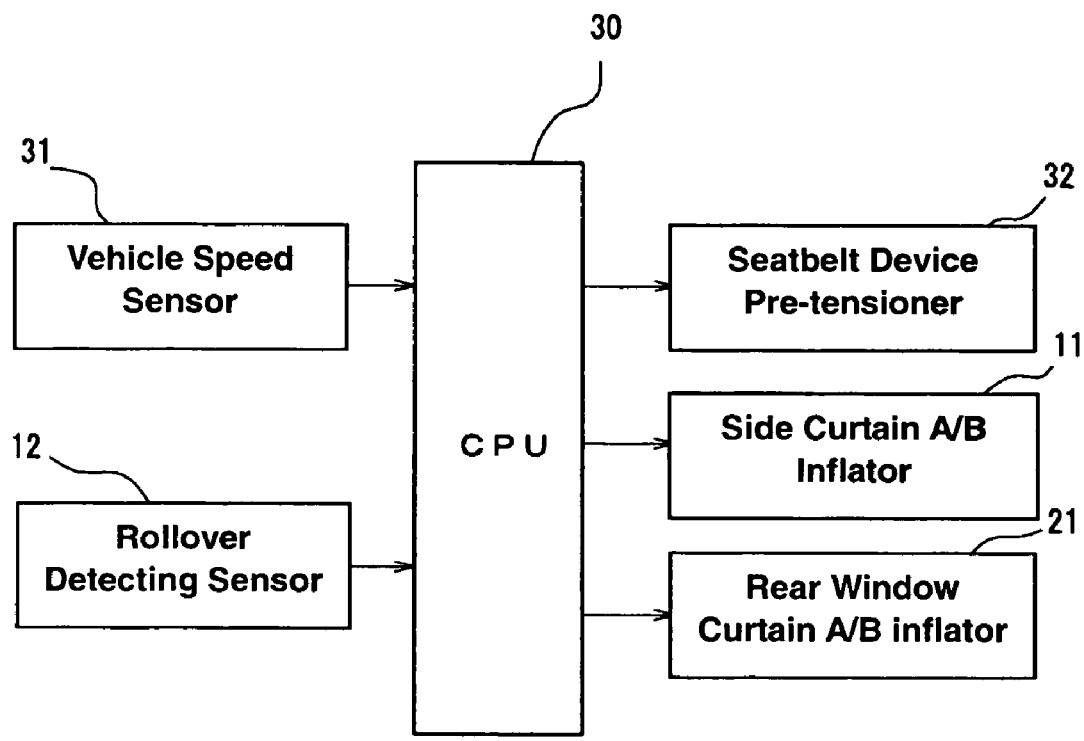
FIG. 7 is a control block diagram of the present embodiment.

A control block operative to perform the above-described control will be described referring to FIG. 7. The device according to the present embodiment comprises the control block that comprises a CPU 30 as processing means; a speed sensor 31 and the rollover detecting sensor 12 as input means; and a pre-tensioner 32 of the seatbelt device, the inflator 11 of the side curtain airbag device and the inflator 21 of the rear window curtain airbag device as output means.

Further, another sensor such as a vehicle side-crash sensor may be applied as input means to function the above-described output means according to the vehicle side crash.

Figure 8:
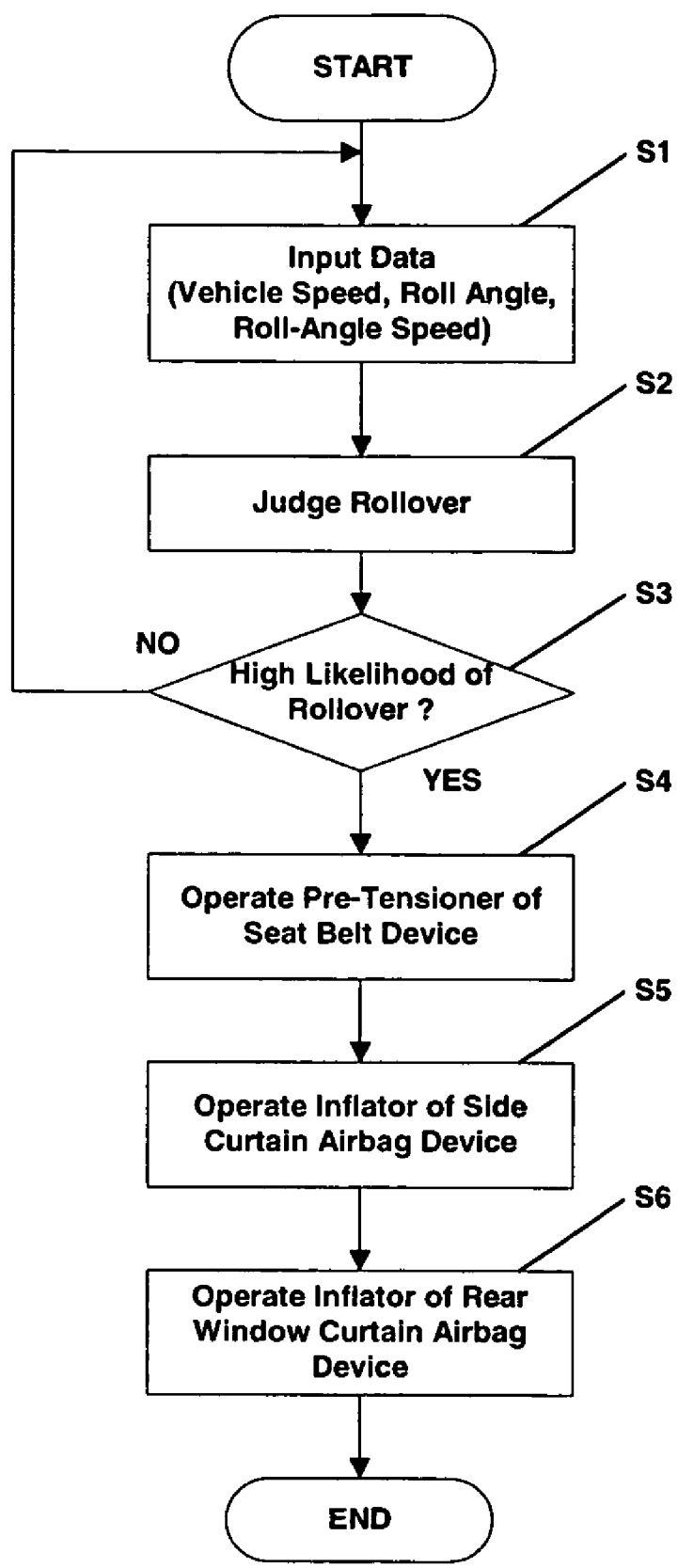
FIG. 8 is a control flowchart of the present embodiment.

This control block is controlled by the control flowchart of FIG. 8.

First, in step S1, the data from the speed sensor 31 and rollover detecting sensor 12 are inputted, where the vehicle speed, roll angle and roll-angle speed are imputed in the CPU.

Next, in step S2, the calculation for the rollover judgment is executed. The high likelihood of rollover is judged, for example, when the vehicle speed is more than 100 km/h, the roll angle is 5 degree and the roll-angle speed is more than a specified value.

When the high likelihood of rollover is not judged in step S3 (NO), the control sequence retunes to the step S1 for the above-described steps.

Meanwhile, when the high likelihood of rollover is judged in step S3 (YES), the control sequence proceeds to step S4, where the pre-tensioner of the seatbelt device is operated.

This is because the passenger's head H is kept stable first by restraining the passenger's torso quickly at the rollover judgment, so that the airbag 20 can be surely inflated between the rear window 4 and the passenger's head H.

Subsequently, the inflator 11 of the side curtain airbag device is operated in step S5, thereby inflating the airbag 10 in the curtain shape inside the side windows 5a, 6a.

Further, in step S6, the inflator 21 of the rear window curtain airbag device is operated, thereby inflating the airbag 20 in the curtain shape inside the rear window 4.

The operating timing of the inflator 11, 21 may be set in such a manner that the both are operated almost at the same time or the rear window curtain airbag is inflated later than the side curtain airbag.

In the case of the same timing, the passenger's head can be covered in the early stage, thereby improving the safety. In the case of the rear window curtain airbag being inflated later, the airbag 20 can be inflated and inserted into the gap between the passenger's head H and the rear window 4 at a proper timing when the gap is created widely after the vehicle rollover.

Thus, the airbags 10, 20 are inflated in the curtain shape inside the side windows 5*a*, 6*a* and the rear window 4, respectively. As a result, part of the passenger's body can be prevented from getting out of the windows.

The inflation state can be maintained for a long time because the inflator 21 is comprised of the low-temperature type of the inflator as described above. Thereby, the airbag 20 can be kept inflated in the curtain shape until the vehicle rollover is complete.

The device for vehicle rollover of the present embodiment is controlled this way, so that the passenger protection can be improved at the vehicle rollover.

As described above, according to the airbag device for rollover countermeasure of the present embodiment, the airbag 20 is inflated in the curtain shape inside the rear window 4 in addition to the side windows 5*a*, 6*a*. Thereby, part of the passenger's body can be prevented from getting out of the rear window 4 even in the vehicle whose rear window is located above the seat back 2*a* of the rear seat.

In particular, the airbag 20 is placed at the portion near the upper edge of the rear window 4 and inflated inside the rear window 4 when the vehicle rollover is detected or predicted. Thereby, the airbag 20 can be inflated surely above the passenger and thus the passenger protection can be improved.

Figure 9:
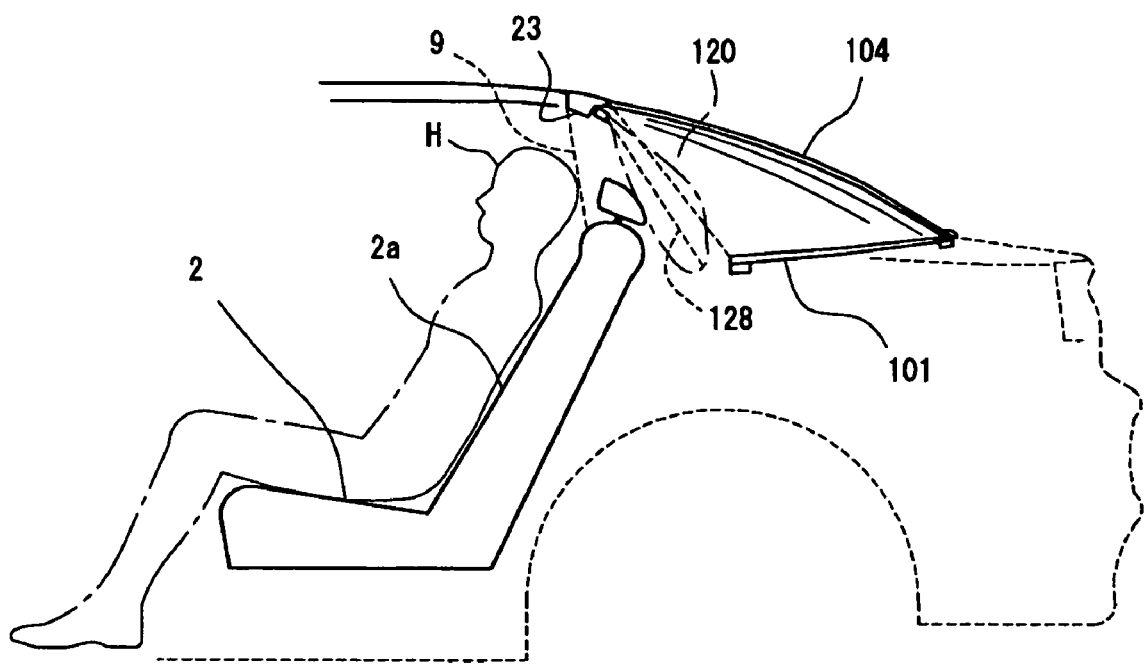
FIG. 9 is a sectional view of a modified embodiment, which corresponds to FIG. 4.
Figure 10:
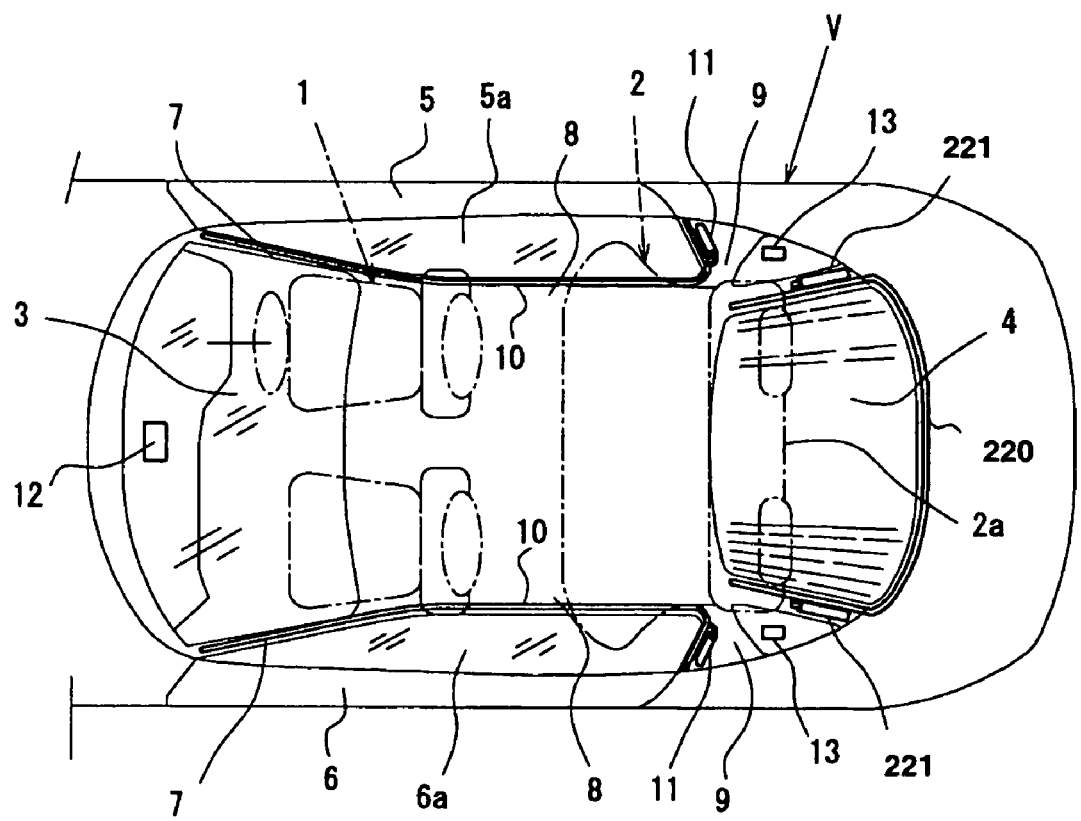
FIG. 10 is a schematic plan view of a vehicle equipped with a second embodiment of the present invention.

Next, a modified embodiment of the present embodiment will be described referring to FIG. 9. In the modified embodiment, only the B pillar 9 is provided without the C pillar 24, both lateral sides of a rear window 104 are curved further, and an attaching portion 128 of an airbag 120 disposed at its both sides is located at the rear end of the B pillar 9.

Likewise, the upper portion of the airbag 120 of this embodiment is located behind the rear header 23 at the upper edge of the rear window 104, and other structures of this embodiment are the same as those in the previous embodiment. Herein, the same structure and components are denoted by the same reference characters, whose descriptions are omitted.

The airbag 120 is placed at the portion behind the rear header 23 and at the rear end of the B pillar 9, which is inflated toward the vehicle rear (downward) as illustrated in a dash-dotted line.

The inflators, rollover sensor and others, not illustrated, are the same as those in the previous embodiment.

Thus, the airbag 120 can be inflated properly in the curtain shape between the passenger's head H and the rear window 104 in this embodiment as well.

In this embodiment, particularly, since the gap between the passenger's head H and the rear window 104 is wider than that in the previous embodiment, the thickness of the inflated airbag 120 can be made larger, thereby improving the function of impact absorption.

Also, since the airbag 120 is not inflated in space above a rear package tray 101, any objects on the rear package tray 101 would not interfere with inflation of the airbag, so that the proper inflation of the airbag 120 can be attained.

The element correspondence of the present invention to the previous embodiments are as follows. The seat corresponds to the rear seat 2, the rollover detecting device corresponds to the CPU 3, and the tension applying device corresponds to the pre-tensioner of the retractor device 14.

Embodiment 2

Hereinafter, another embodiment of the present invention will be described referring to FIGS. 10 through 19. Herein, the same constitutions as those in the previous embodiment will be denoted by the same reference characters and their detailed descriptions are omitted here.

In the present embodiment, the airbag is placed at a portion near a lower edge of the rear window, and the airbag is configured so as to be inflated toward the vehicle front along the rear window from the portion near the upper edge of the rear window.

Namely, the rear window curtain airbag device of the present embodiment comprises an airbag 220 that is placed at a lower edge of the rear window 4, two inflators 221, 221 operative to inject the gas for airbag 220, and connecting pipes 222, 222 to supply the gas injected from the inflators 221, 221 to the airbag 220.

The airbag 220 is placed at the lower edge of the rear window 4 in the folded state, more specifically it is placed in substantially a U shape at the front of a cross mememebr 223 that extends in the vehicle width direction to support the rear window 4 and the rear end of the C pillar 24 located at the lateral both sides of the rear window 4.

The airbag 220 is comprised of a canvas-made bag member in substantially a trapezoid shape in the plan view, which comprises an inflating portion 226 and an non-inflating portion that are connected to the upper edge of the rear window 4, and an attaching portion 228 that is connected to the C pillar 24.

Figure 11:
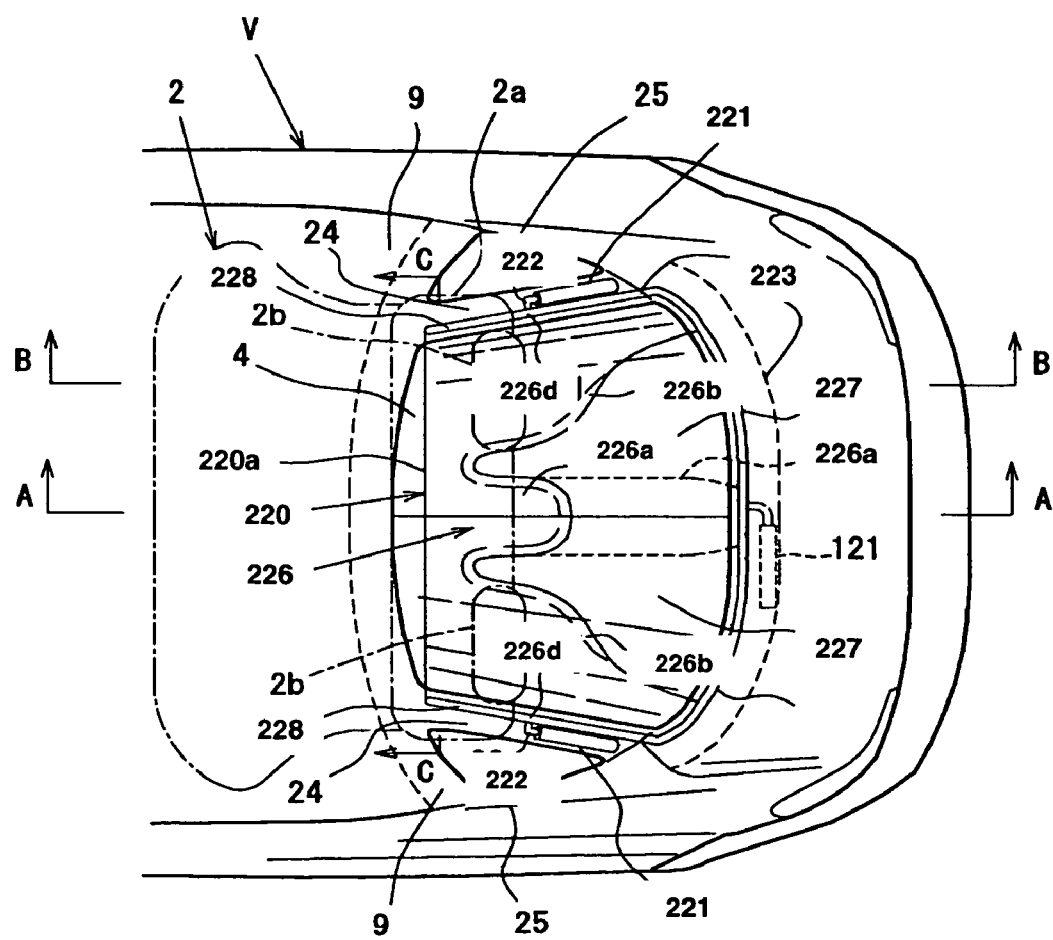
FIG. 11 is a specific plan view of a rear portion of the vehicle.
Figure 12:
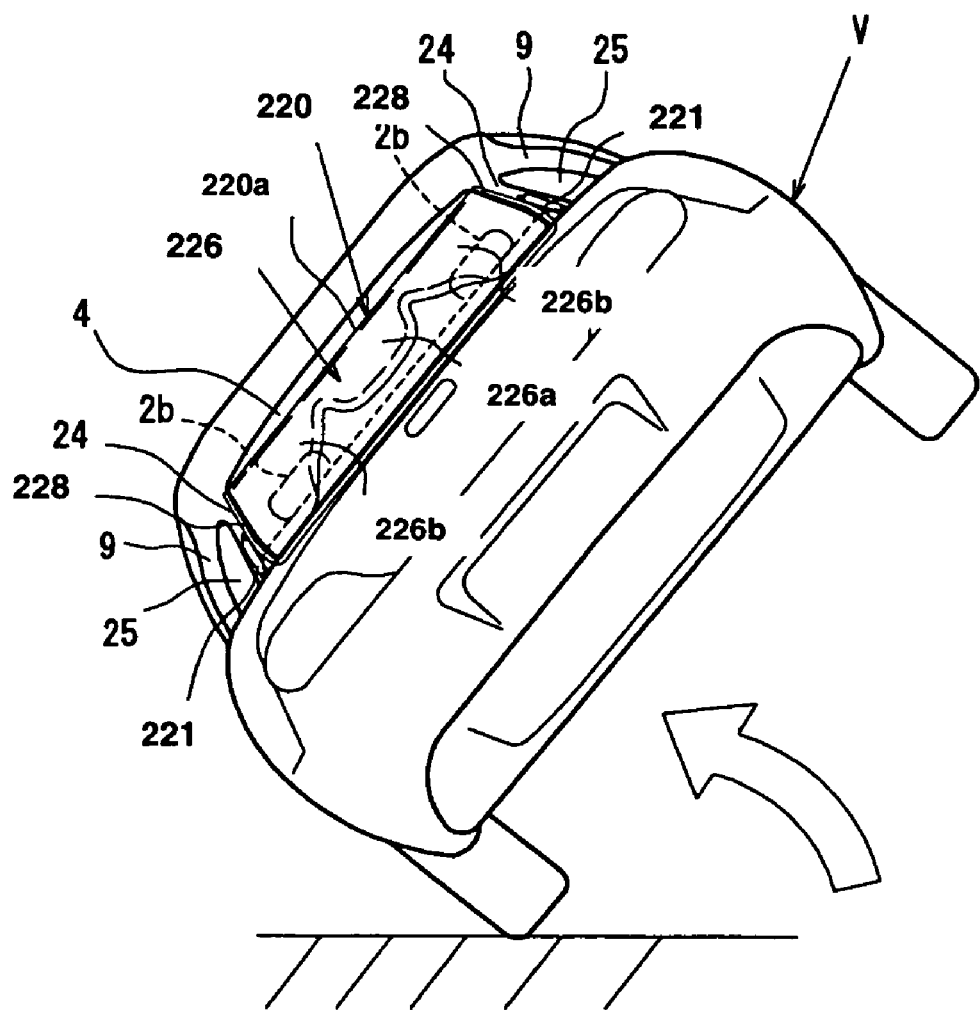
FIG. 12 is a rear view of the vehicle when the vehicle rollover is predicted.

When it is inflated, as illustrated in FIG. 11, the airbag 220 is inflated toward the vehicle front so as to cover substantially a whole portion of the rear window 4 (to a position that is located before the upper end of the seat back 2*a*).

Thus, the airbag 220 inflated in the curtain shape is located between the rear seat 2 and the rear window 4, so part of passenger's body can be prevented from getting out of the rear window 4 when the vehicle V is rolled over.

In particular, since the airbag 220 is inflated forward from the vehicle rear, the passenger's head H would not be an obstacle for the airbag 220 inflated forward. Because the passenger's head H tends to be moved forward easily by being pushed by the airbag 220. Thereby, the airbag 220 can be surely inflated between the passenger's head H and the rear window 4.

The inflating portion 226 comprises side portions 226*b*, 226*b* that are inflated to be located at both lateral sides and extend upward from the lower end portion of the airbag 220 and a central portion 226*a* that is inflated to be located at the canter and extend upward from the central portion of the airbag 220. These portions 226*a*, 226*b*, 226*b* are connected to each other at the upper portion. The side portions 226*b*, 226*b* are located above the heads of the side-sitting passengers and the central portion 226*a* is located above the head of the center-sitting passenger.

The inflating portion 226 includes gas supply ports 226*d*, 226*d* that are provided at the center of the side portions 226*b*, 226*b*. The gas from the inflators 221, 221 are taken in the airbag 226 via these ports 226*d*, 226*d*. Thereby, first the gas can be supplied into the side portions 226*b*, 226*b*, and then supplied into the central portion 226*a*.

In the present embodiment, the sitting positions of the passengers (the positions of the headrests 2*b*, 2*b*) are located below the side portions 226b, 226b of the airbag 226. Thereby, the airbag 220 can be inserted into the gap between the passenger's head H and the rear window 4 in the early stage of the inflation of the airbag 220, and the airbag 220 can be surely inflated above the passengers.

In the vehicle whose the rear window 4 comprises the above-described curved widow pane 25, the gap between the passenger's head H and the rear window 4 is relatively small. Therefore, the above-described structure can provide a superior effect in particular.

Figure 14:
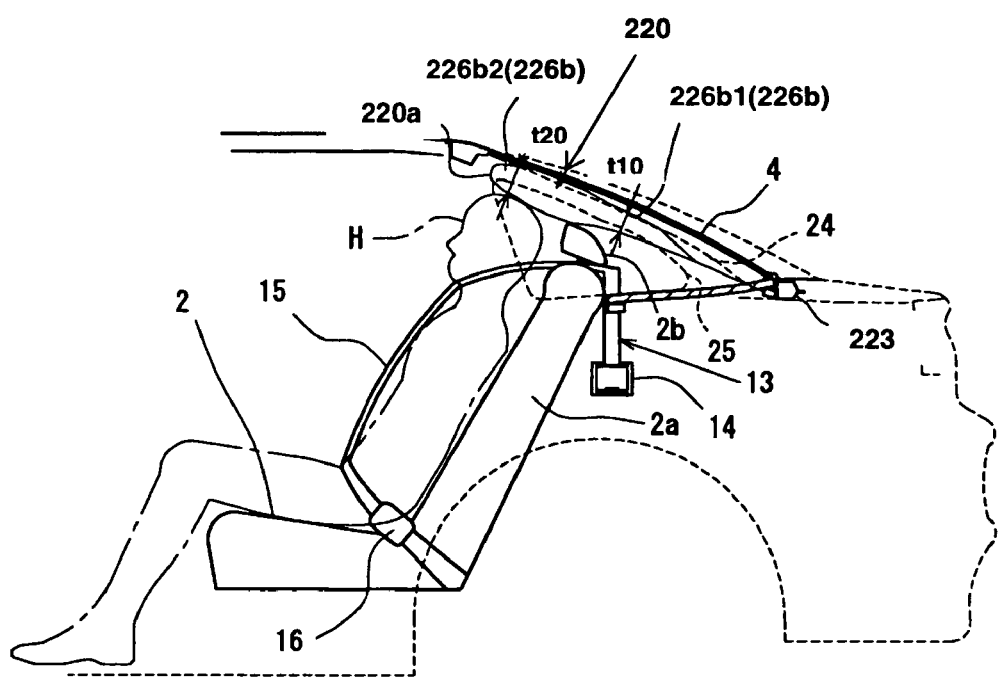
FIG. 14 is a sectional view taken along line B-B of FIG. 11.

As illustrated in FIG. 14, the vertical-direction thickness t20 of the portion of the side portions 226b, 226b of the inflating portion 226 that is located in front of the upper end of the seat back 2a is larger than the vertical-direction thickness t10 of the portion of the side portions 226b, 226b of the inflating portion 226 that is located behind the upper end of the seat back 2a.

According to this thickness setting of the side portions 226b with the larger vertical-direction thickness t20 of the front portion, a front-side portion 226b2 of the inflating portion 226 has a relatively large vertical-direction thickness, the hitting impact can be properly absorbed by this portion when the passenger's head H hits against the airbag 220.

Also, the portion 226b2 corresponding to the front portion can be inflated widely, so the large tension can be provided in the vehicle width direction at an upper end portion 220a of the airbag 220.

Herein, the thickness t10 of a rear-side portion 226b1 of the side portion 226b is not so large. This is because the vehicle-width-direction tension provided at the lower portion of the airbag 220 may not need to be so large.

Also, since the thickness t10 of a rear-side portion 226b1 of the side portion 226b is not so large, the mount of the supply gas can be reduced properly. Thereby, the size of the inflator 221 can be made small and the inflation of the airbag 220 in the early stage can be attained.

Figure 13:
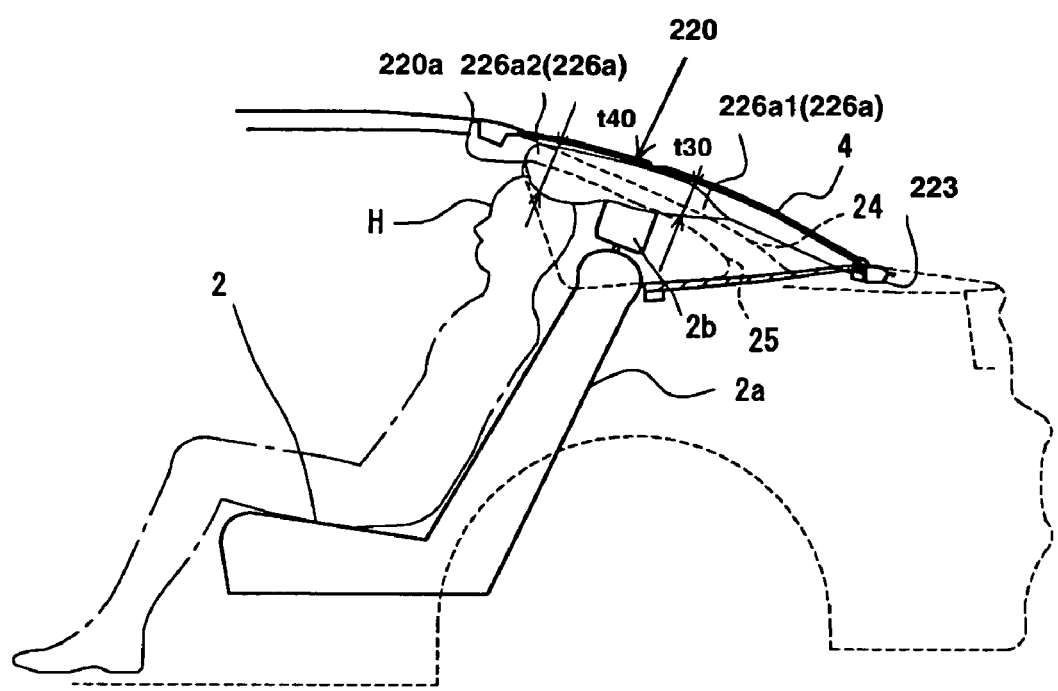
FIG. 13 is a sectional view taken along line A-A of FIG. 11.

Also, as illustrated in FIG. 13, the vertical-direction thickness t30 of a portion of the central portions 226a of the inflating portion 226 that is located behind the upper end of the seat back 2a is relatively medium, and the vertical-direction thickness t40 of a portion of the central portion 226a of the inflating portion 226 that is located in front of the upper end of the seat back 2a is relatively large.

According to this thickness setting of a front-side portion 226a2 with the thickness t40 that is larger than that of a rear-side portion 226a1, the front-side portion 226a2 can be inflated widely at the center where the passenger is not located with two passengers sitting in the rear seat, and the large tension can be provided in the vehicle width direction at a upper end portion 220a of the airbag 220.

In particular, in the case where the rear window 4 is configured with the curved window pane like the present embodiment, enough spaces for the airbag inflation can not be provided at the lateral both sides. Accordingly, the inflating portion 226 is inflated largely at the center where large space may be easily provided, and thereby the proper tension can be provided in the vehicle width direction.

Figure 15:
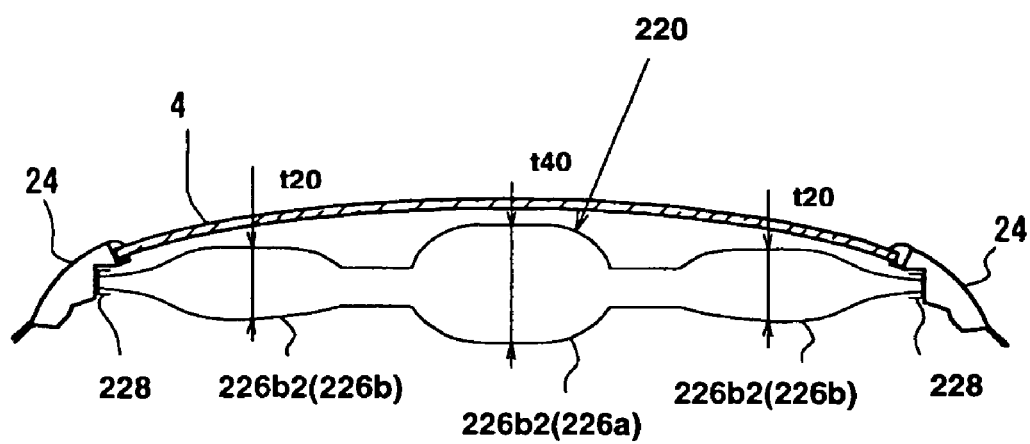
FIG. 15 is a sectional view taken along line C-C of FIG. 11.
Figure 16:
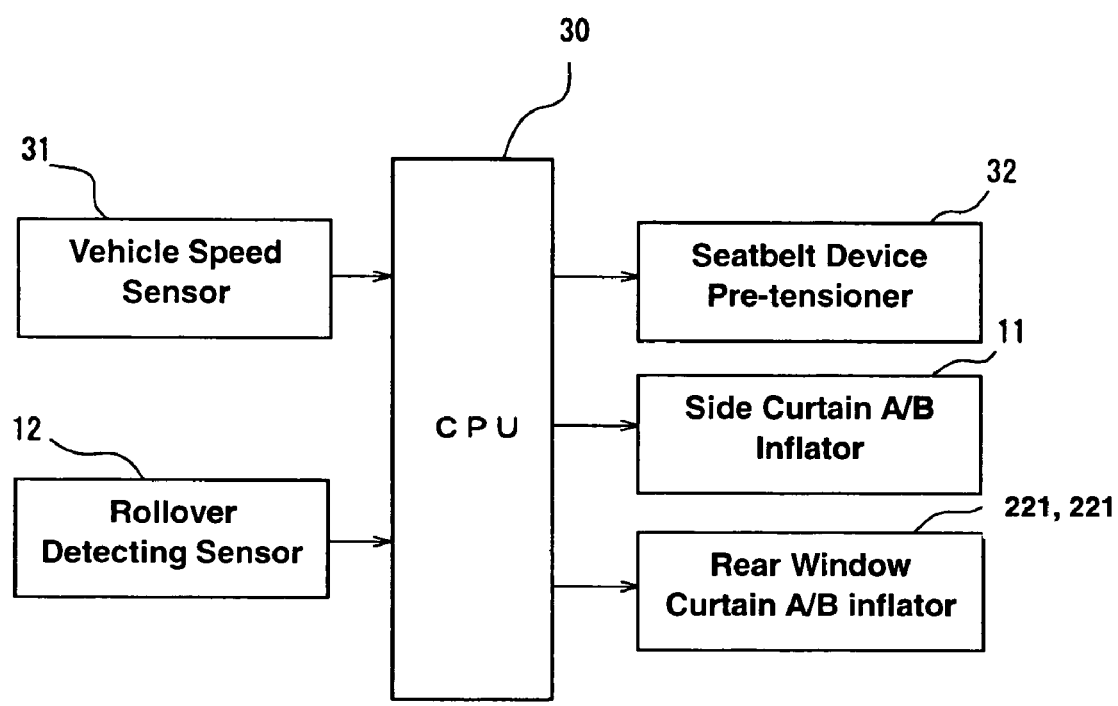
FIG. 16 is a control block diagram of the present embodiment.
Figure 17:
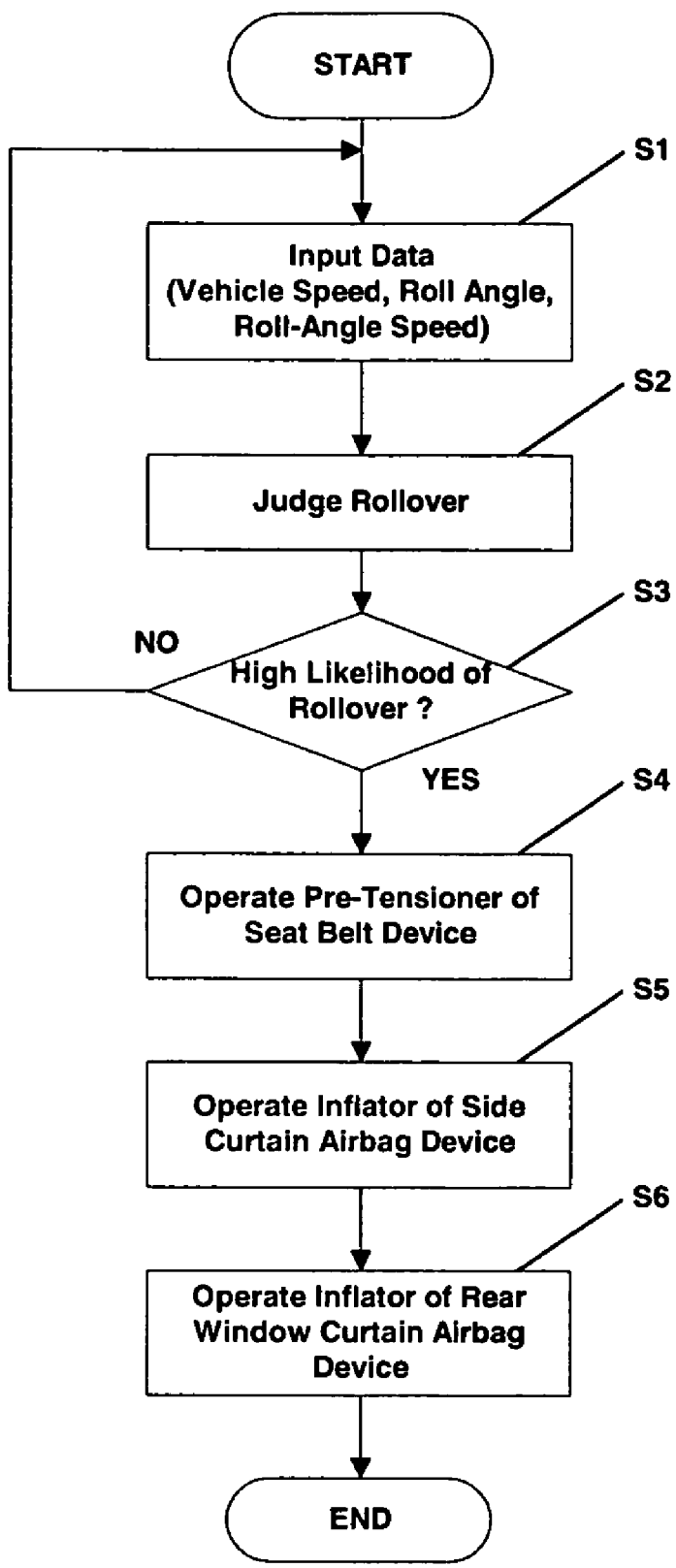
FIG. 17 is a control flowchart of the present embodiment.

As illustrated in FIG. 15, a sectional view taken along line C-C of FIG. 11, the center portion of the rear widow 4 with the curved pane is located in the higher position than the lateral side portions of the rear window 4. Thus, the vertical-direction thickness t40 of the central portion 226a can be set to be larger than the thickness t20 of the side portions 226b, 226b. Thereby, without the larger thickness t20 of the side portions 226b, 226b, the proper tension can be provided in the vehicle width direction at the upper portion 220a of the airbag 220.

Herein, as long as the rear window 4 is configured with the curved window pane described above, the airbag can be inflated properly even when three passengers sit in the rear seat.

The reason why the vertical-direction thickness t30 of the rear-side portion 226a1 of the central portions 226a is set to be relatively medium is just to provide the proper tension at the middle portion of the airbag 220 in the width direction and there is no need to impact absorption for the passengers. Accordingly, as long as this proper tension could be provided, the thickness t30 may be set to be smaller, or no inflating portion 226 may be formed.

Also, in order to provide more appropriate protection of the passenger, the above-described thickness t10, t20 of the side portions 226b, 226b may be set to be relatively large as long as a proper inflation space could be provided between the rear window 4 and the passenger's head H.

Further, as illustrated by a broken line in FIG. 11, the central portion 226a may be located to extend toward the vehicle rear and the gas may be supplied to this from the inflator 121 placed at the rear end of the central portion 226a. In this case, since it is supplied from the center portion in the vehicle width direction the gas can be supplied uniformly into the whole area of the airbag. Also, since the single inflator 121 is provided, a compact disposition of the inflator at the edge of the rear window 4 can be provided.

The above-described non-inflating portions 227, 227 are located between the inflating portions 226a, 226b, 226b so as to stabilize the location of the respective inflating portions 226a, 226b, 226b and prevent the passengers from being moved upward.

The above-described attaching portion 228 is provided at the lateral both sides of the airbag 220 so as to attach the airbag 220 firmly to the lateral both edges of the rear window 4.

The upper end of the attaching portion 228 is attached to the upper portion of the C pillar 24, so the tension can be provided by the upper end portion 220a when the airbag 220 is inflated.

The rear end portion of the airbag 220 is also fixed to the rear end of the rear window 4.

The above-described inflators 221, 221 are disposed in the lateral C pillars 24, 24 in such a manner that their longitudinal direction is along the vehicle width direction.

The above-described connecting pipes 222, 222 are disposed in the C pillars 24, 24 so as to connect the injection port of the inflators 221, 221 and the gas supply ports 226d, 226d of the airbag 220.

Since the gas is supplied from the connecting pipes 222, 222 via two ports 226d, 226d located at the side portions 226b, 226b, the airbag 220 is inflated from the side portions 22b 226b as described above. Accordingly, the airbag 220 can be inflated promptly in the gap between the passenger's head H and rear window 4.

Herein, the seatbelt device 13 for the passenger (see FIG. 14), the control block to control the device (see FIG. 16), and their control flow steps (see FIG. 17) of the present embodiment are substantially the same as those in the previous embodiment, so their descriptions are omitted here.

Herein, the operating timing of the two inflators 221, 221 of the rear window curtain airbag device in the present embodiment may be configured so as to differ from each other according to the direction of the vehicle rollover. For example, the left inflator 221 may be first inflated when the vehicle V is rolled over toward the left, so that the airbag 220 can be inflated from the left side.

In this case where the operating timing of the inflators is changed according to the vehicle rollover direction, the airbag 220 can be inflated properly for the passenger's body movement. Thereby, the passenger protection can be further improved.

As described above, according to the airbag device for rollover countermeasure of the present embodiment, the airbag 220 is inflated in the curtain shape inside the rear window 4 in addition to the side windows 5a, 6a. Thereby, part of the passenger's body can be prevented from getting out of the rear window 4 even in the vehicle whose rear window is located above the seat back 2a of the rear seat.

In particular, the airbag 220 is placed at the portion near the lower edge of the rear window 4 and inflated inside the rear window 4 from the rear side when the vehicle rollover is detected or predicted. Thereby, the passenger's head H would not be the obstacle for the airbag 220 inflated forward, so the airbag 220 can be surely inflated between the passenger's head H and the rear window 4. As a result, the passenger protection can be further improved.

Figure 18:
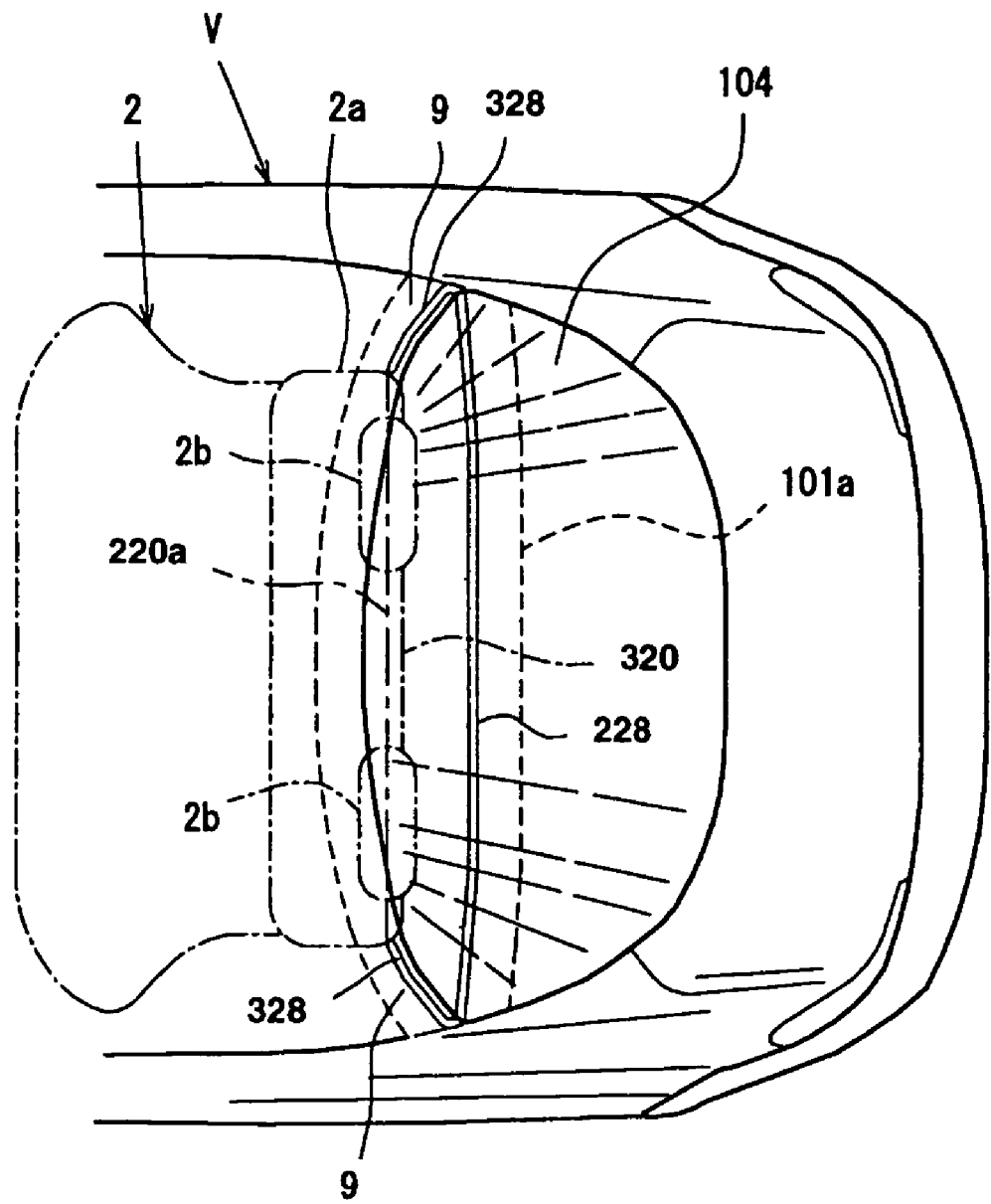
FIG. 18 is a specific plan view of a rear portion of the vehicle of a modified embodiment.
Figure 19:
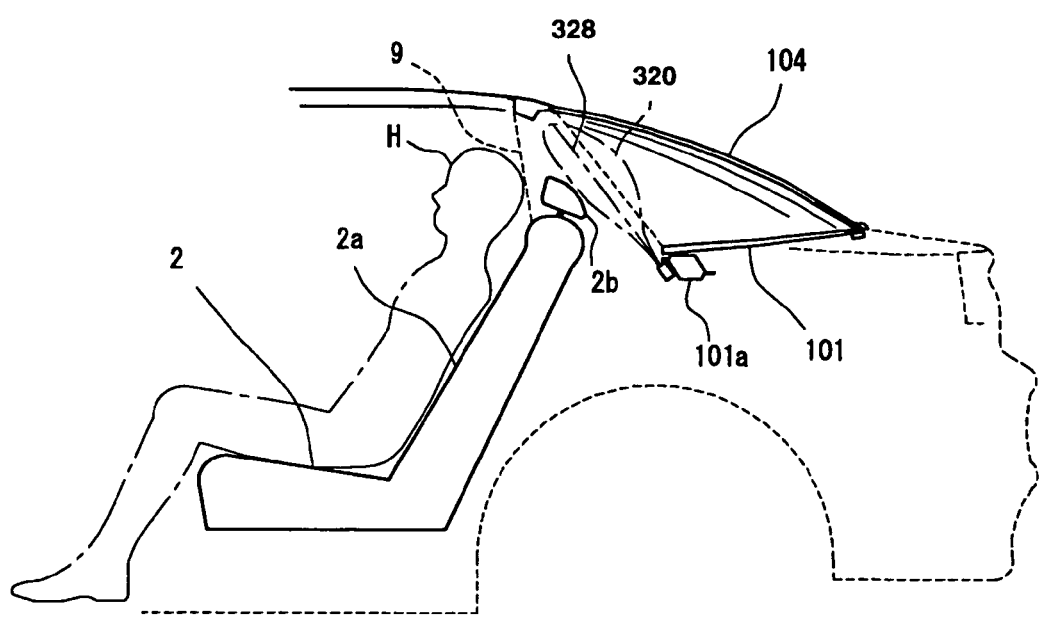
FIG. 19 is a sectional view of the modified embodiment, which corresponds to FIG. 13.
Figure 20:
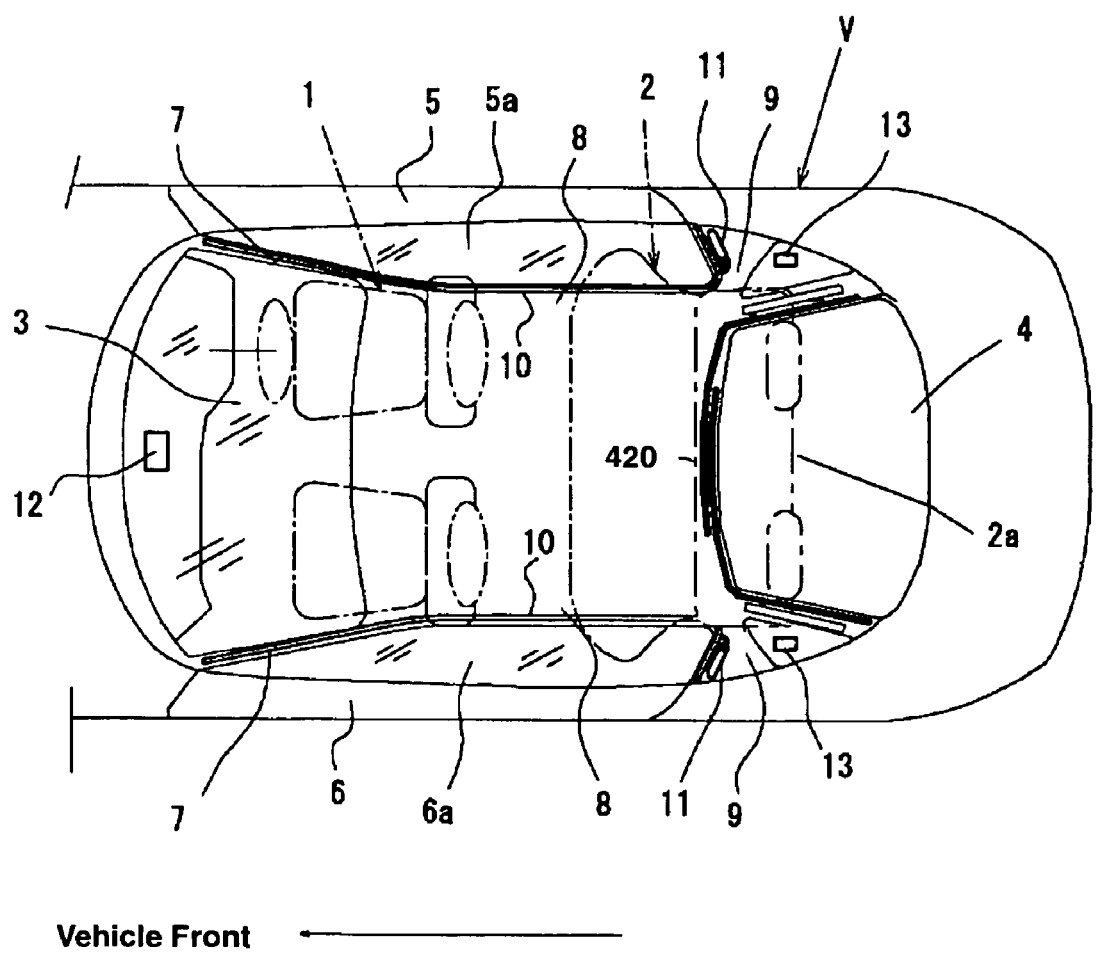
FIG. 20 is a schematic plan view of a vehicle equipped with a third embodiment of the present invention.

Next, a modified embodiment of the present embodiment will be described referring to FIGS. 18, 19. In the modified embodiment, only the B pillar 9 is provided without the C pillar 24, and both lateral sides of a rear window 104 are curved further.

Accordingly, both ends of an airbag 320 are placed at the rear end of the B pillars 9, 9, and their lower end is placed at the front end of the rear package tray 101 located behind the seat back 2a of the rear seat 2.

Likewise, the airbag 320 of this embodiment is located at the portion near the lower edge of the rear window 104, and other structures of this embodiment are the same as those in the previous embodiment. Herein, the same structure and components are denoted by the same reference characters, whose descriptions are omitted.

The airbag 320 is placed at the portion at the front end of the rear package tray 101, specifically at an attaching portion 328 that is located before a cross frame 101a located at the front end of the rear package tray 101 and at the rear ends of the B pillar 9, 9, which is inflated toward the vehicle front (upward) as illustrated in a dash-dotted line.

The inflators, rollover sensor and others, not illustrated, are the same as those in the previous embodiment. Thus, the airbag 320 can be inflated properly in the curtain shape between the passenger's head H and the rear window 104 in this embodiment as well.

In this embodiment, particularly, since the gap between the passenger's head H and the rear window 104 is wider than that in the previous embodiment, the thickness of the inflated airbag 320 can be made larger, thereby improving the function of impact absorption.

Also, since the airbag 320 is not inflated in space above a rear package tray 101, any objects on the rear package tray 101 would not interfere with inflation of the airbag, so that the sure inflation of the airbag 320 can be attained.

Embodiment 3

Hereinafter, further another embodiment of the present invention will be described referring to FIGS. 20 through 29. Herein, the same constitutions as those in the previous embodiments will be denoted by the same reference characters and their detailed descriptions are omitted here.

In the present embodiment, the airbag comprises a plurality of airbags that are placed at portions near lateral both edges of the rear window, and each airbag is configured so as to be inflated inward in the vehicle width direction along the rear window from the portion near the lateral edge of the rear window.

Namely, the rear window curtain airbag device of the present embodiment comprises the airbags 420, 420 that are placed respectively at portions near the lateral both edges of the rear window 4. Herein, these airbags 420, 420 are disposed symmetrically on the right and left sides with the same structures. Therefore, hereinafter the right-side airbag 420 will be described, omitting the description of the left-side airbag 420.

The right-side airbag 420 comprises a first airbag portion 420a that is placed on the right side of the rear window 4, when viewed from the vehicle rear, a first inflator 421a to inject the gas for the first airbag portion 420a, and a first connecting pipe 422a to supply the gas injected from the first inflator 421a to the first airbag portion 420a.

Figure 21:
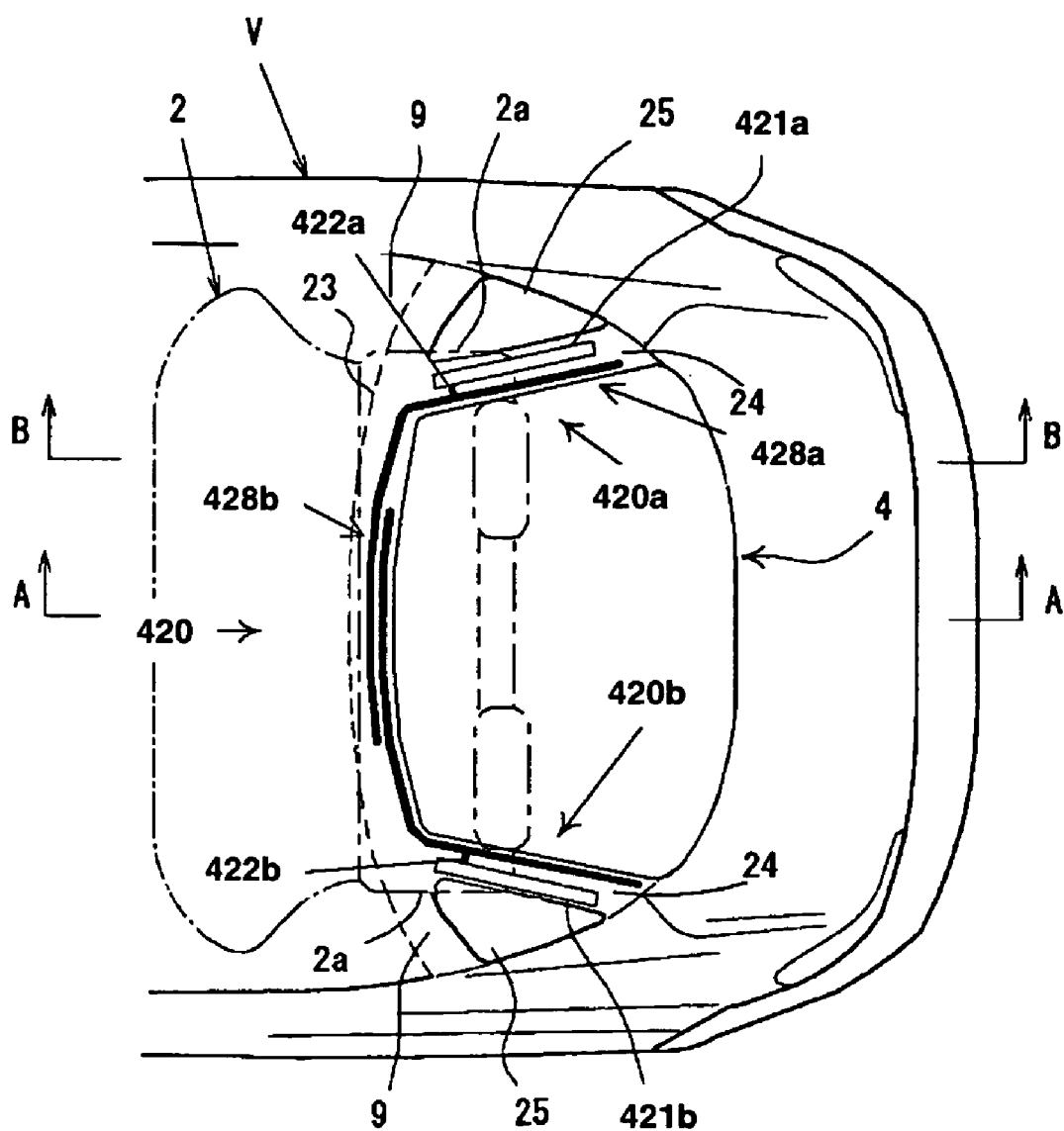
FIG. 21 is a specific plan view of a rear portion of the vehicle, which shows a non-inflation state of a curtain airbag at the rear window.
Figure 22:
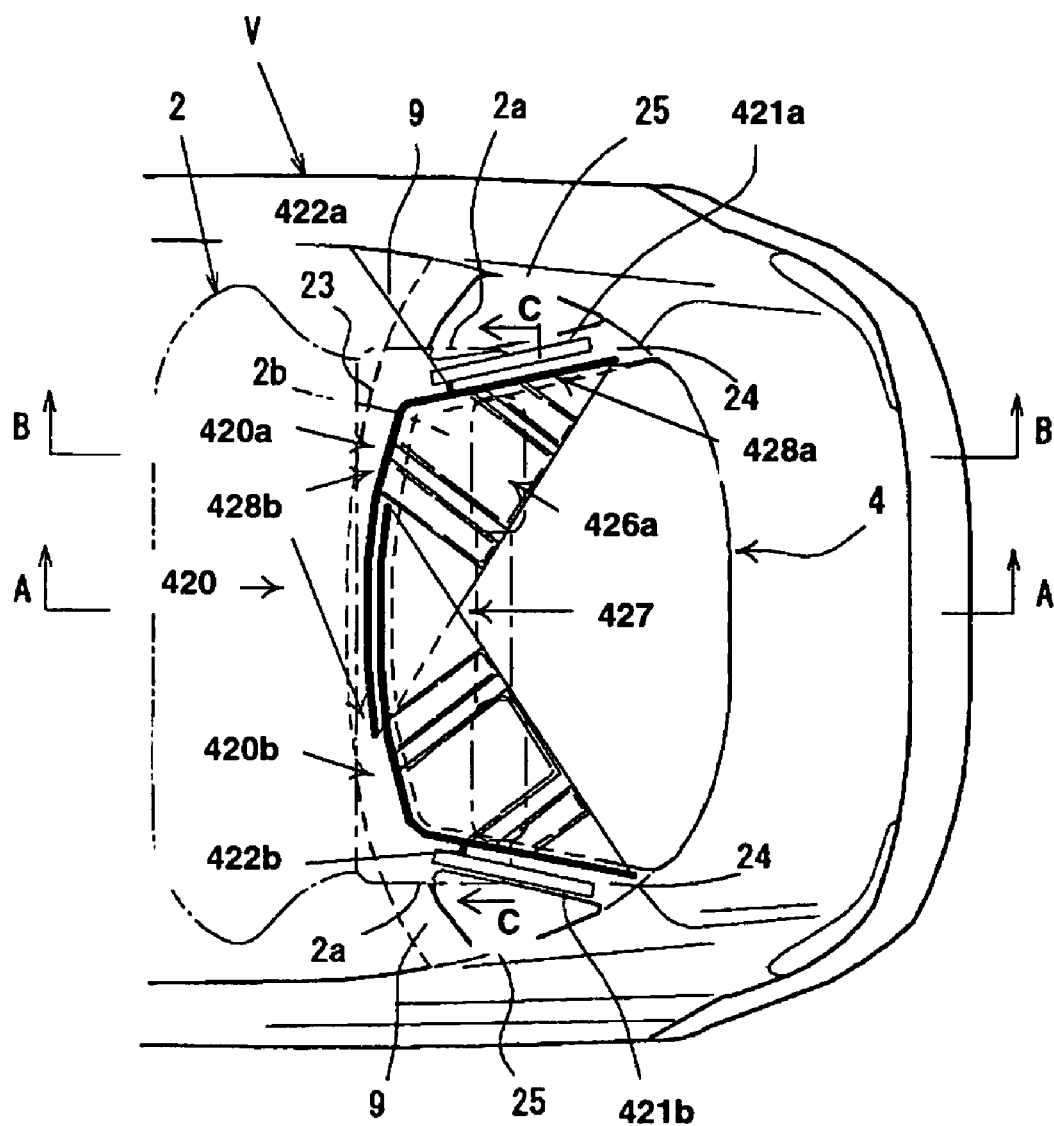
FIG. 22 is a specific plan view of a rear portion of the vehicle, which shows an inflation state of the curtain airbag at the rear window.
Figure 23:
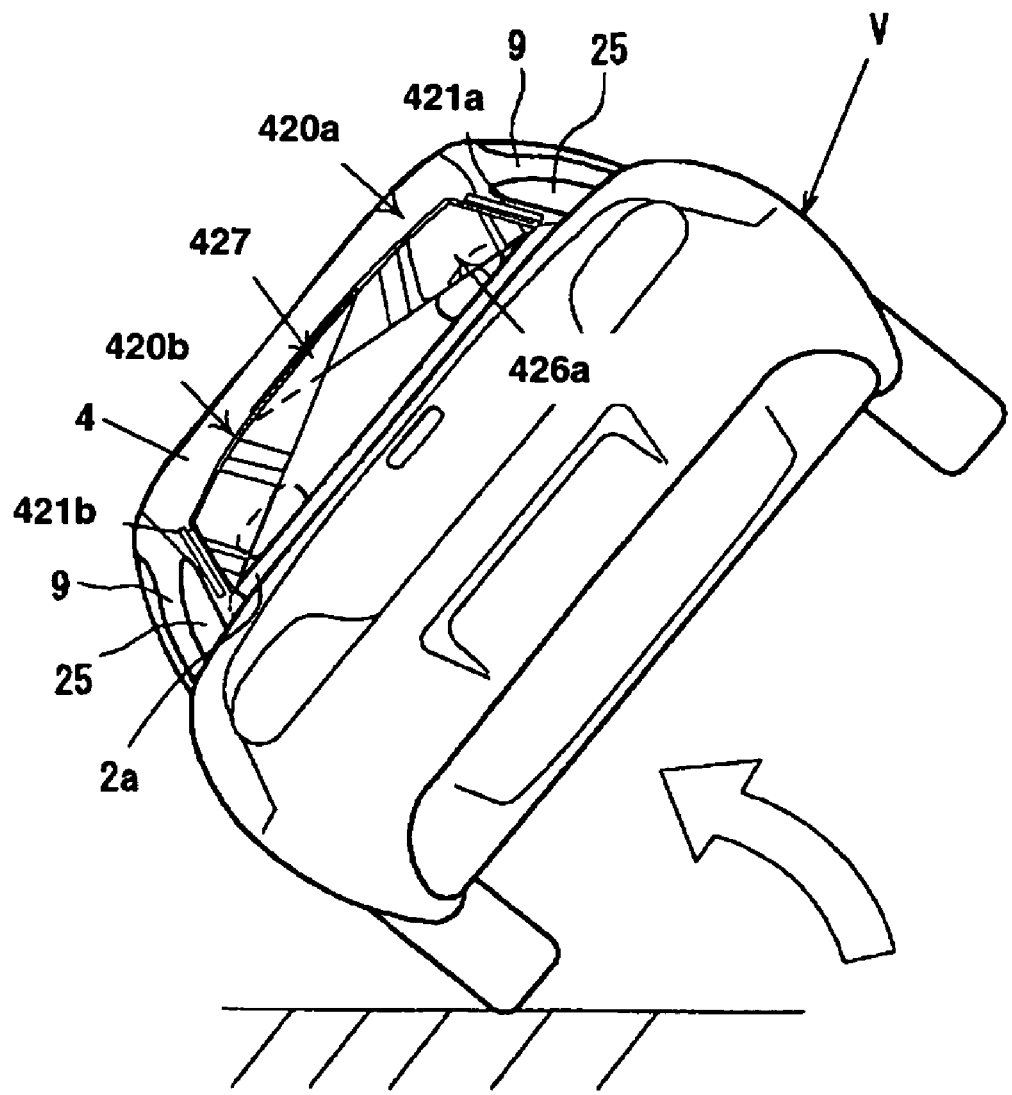
FIG. 23 is a rear view of the vehicle when the vehicle rollover is predicted.

As illustrated in FIGS. 21, 22 and 23, the first airbag portion 420a is placed in such a manner that it is attached to a right-side attaching portion 428a located at the left end of the C pillar 24 so as to extend in the vertical direction along the right side pillar C and that it is attached to an upper-edge attaching portion 428b located at the rear portion of the rear header 23 so as to extend in the vehicle width direction along the upper edge of the rear window 4 at least on the right side. Namely, the first airbag portion 420a is provided along both the right-side attaching portion 428a and the upper-edge attaching portion 428b of the rear window 4. Also, the first airbag 428a is placed in its folded state (see FIG. 27).

When inflated, the first airbag portion 420a is comprised of an inflating portion 426 and a non-inflating portion 427, which forms substantially a triangle shape by being attached to the above-described right-side attaching portion 428a and upper-edge attaching portion 428b. Herein, the upper-edge attaching portion 428b may be comprised of a single attaching point that is located at the left end of the rear header.

To these right-side attaching portion 428a and upper-edge attaching portion 428b are attached the periphery of the first airbag portion 420a, so the first airbag portion 420a is fixed firmly inside the C pillar 24 near the right edge of the rear window 4.

Also, since the first airbag portion 420a is attached to the upper-edge attaching portion 428b at the rear portion of the rear header 23 near the upper edge of the rear window 4, there can be provided the proper tension at the lower end portion of the inflated first airbag portion 420a.

Figure 25:
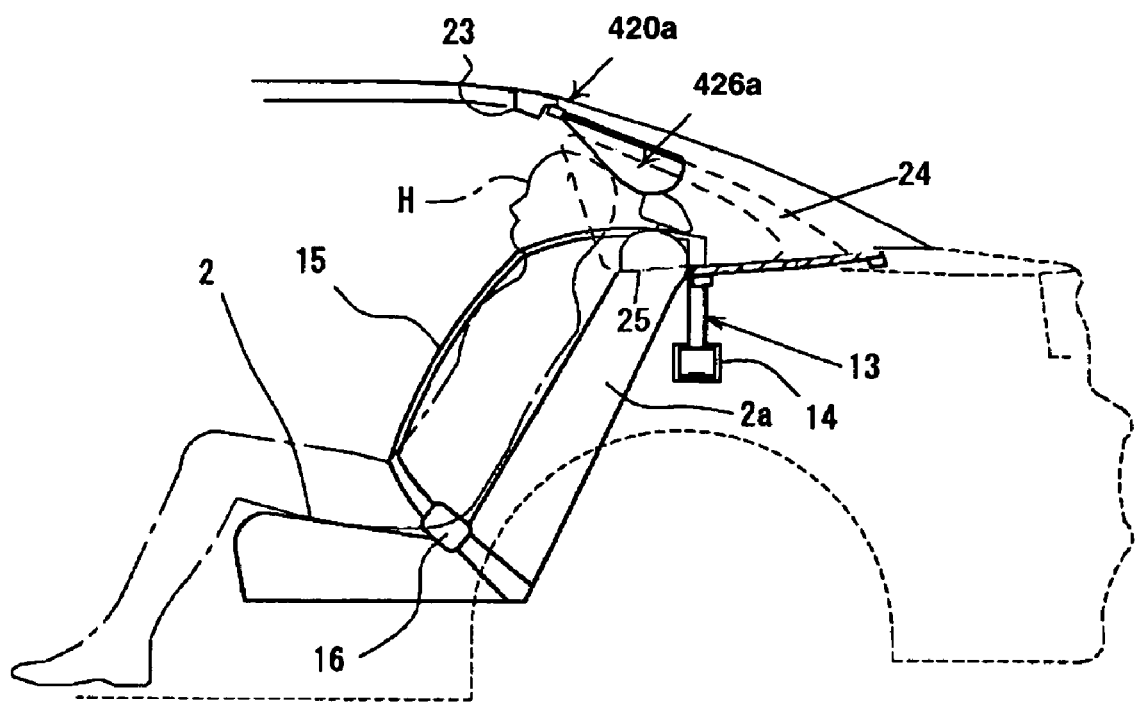
FIG. 25 is a sectional view taken along line B-B of FIG. 22.

The inflating portion 426, as illustrated in FIG. 22, is comprised of a plurality of parts (three in the present embodiment) that are disposed from the right-side attaching portion 428a to the upper-edge attaching portion 428b. Thereby, the inflating portion 426 is configured so as to be inflated from the right-side attaching portion 428a and upper-edge attaching portion 428b toward the vehicle rear and inside obliquely. Herein, as illustrated in FIG. 25, a central portion 426a of the inflating portion 426, which is located at the center and has a relatively large airbag volume, is located above the head of the right-side passenger. The first connecting pipe 422a is connected near the central portion 426a, so the central portion 426a is inflated preferentially.

Thereby, the first airbag portion 420a is inflated from the upper-edge portion above the passenger's head, thereby protecting the passenger's head promptly and properly.

The above-described first inflator 421a is provided on the right of the right-side attaching portion 428a of the C pillar 24 in such a manner that its longitudinal direction is along the vertical direction. Herein, this first inflator 421a is also a low-temperature type of inflator likewise.

The first connecting pipe 422a is disposed in the vehicle width direction, one end of which is connected to the injection port of the first inflator 421a and the other end of which is connected to the gas supply port of the first airbag portion 420a.

The left-side airbag 420 comprises a second airbag portion 420b, a second inflator 421b and a second connecting pipe 422b like the above-described right-side airbag.

FIGS. 22 and 23 shows the inflation state of the first and second airbag portions 420a, 420b in the curtain shape. As illustrated in these figures, when they are inflated toward the vehicle rear and inside obliquely, the first and second airbag portions 420a, 420b are inflated so as to cover an almost front-half area of the rear window 4.

Thereby, the first and second airbag portions 420a, 420b inflated in the curtain shape are located between the passengers in the rear seat 2 and the rear window 4, so that part of the passenger's body can be prevented from getting out of the rear window 4 when the vehicle V is rolled over.

Also, since these airbag portions 420a, 420b are inflated not so as to cover the rear-half area of the rear window 4, the gas volume supplied by the first and second inflators 421a, 421b can be made smaller, and the volume of the first and second airbag portions 420a, 420b (inflating portion 426) can be made smaller. Thereby, the first and second airbag portions 420a, 420b can be inflated promptly.

Figure 26:
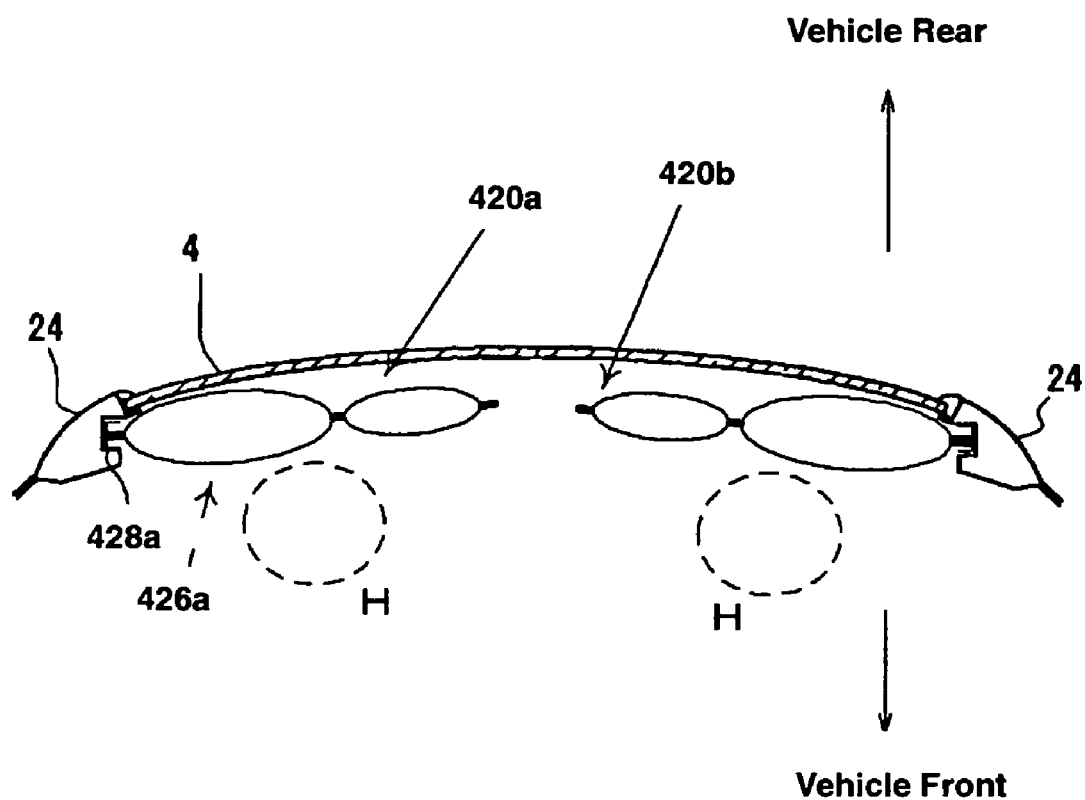
FIG. 26 is a sectional view taken along line C-C of FIG. 22.

In the case, as illustrated in FIG. 26, where the rear window 4 includes the curved window pane, whose central portion at the upper edge projects toward the vehicle rear relative to lateral side portions thereof for the vehicle designing or the aerodynamic characteristic, it is preferable that the first and second airbag portions 420a, 420b are inflated toward the center of the rear window 4. Because, in this case, these airbag portions can be inflated at portions that are relatively away from the passenger's head, so the interference of the airbag portions 420a, 420b with the passenger' head can be avoided properly.

Figure 24:
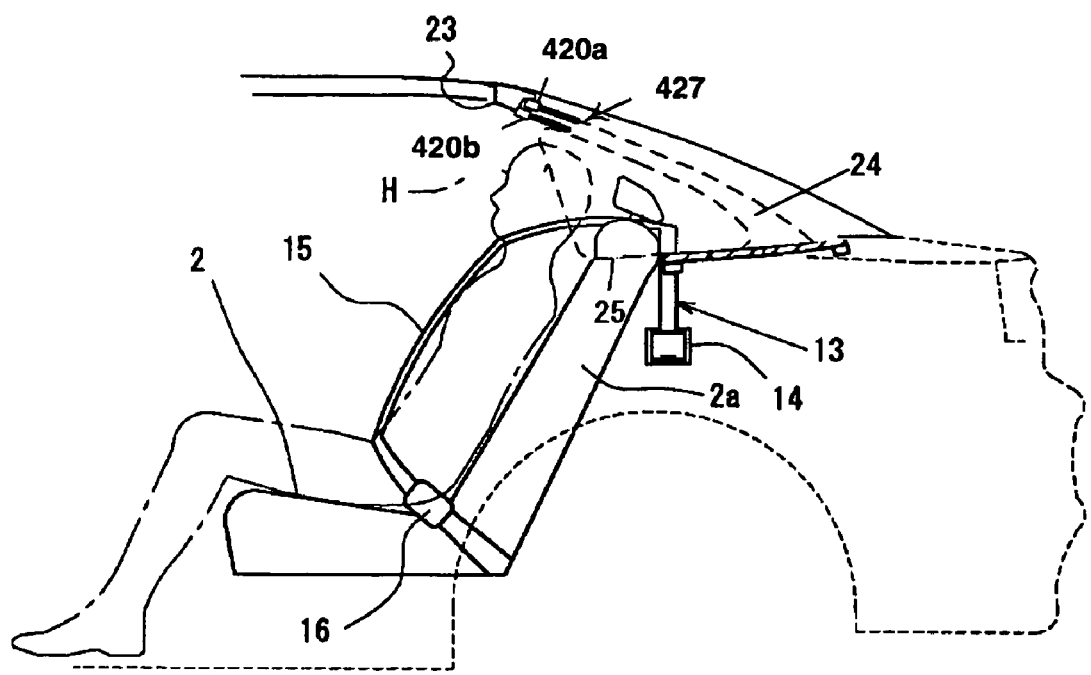
FIG. 24 is a sectional view taken along line A-A of FIG. 22.

Further, as illustrated in FIGS. 22 and 24, the first and second airbag portions 420a, 420b are configured so as to be inflated in such a manner that the non-inflating portions 427 overlap near the upper edge of the rear window 4. Thereby, the central portion of the rear window 4 can be covered widely by the first and second airbag portions 420a, 420b inflated.

Figure 27:
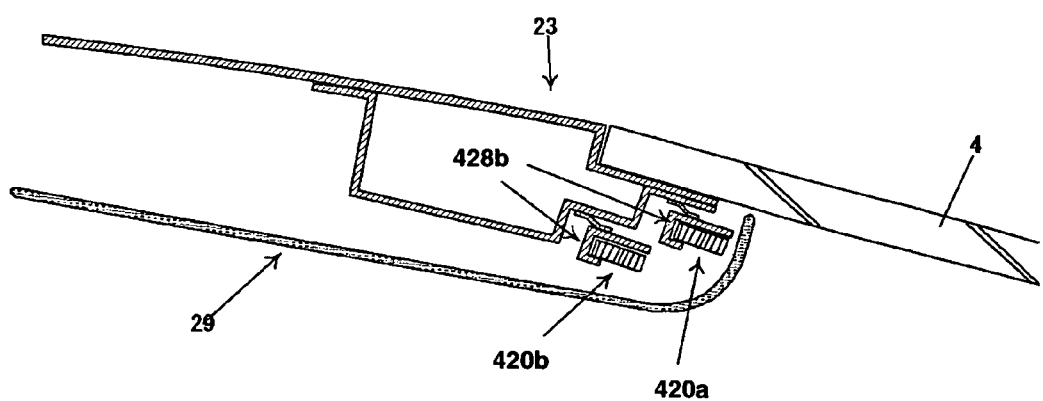
FIG. 27 is an enlarged side view showing a detailed structure of FIG. 24.

The first and second airbag portions 420a, 420b in the folded state overlap at the center of the upper edge of the rear window 4, and when they are inflated, the non-inflating portions 427 overlap. Also, as illustrated in FIG. 27, the second airbag portion 420b is attached to the rear header 23 so as to be offset from the first airbag portion 420a, so the both non-inflating portions 427 do not interfere with each other.

Also, the first airbag portion 420a is located at an upper portion of a roof trim 29 compared to the second airbag portion 420b. Thereby, the rear end of the roof trim 29 can be pushed down by the inflating pressure of the airbag portions 420a, 420b.

Herein, the airbag portions 420a, 420b may be comprised of only the inflating portions 426, 426, without the non-inflating portions 427.

Figure 28:
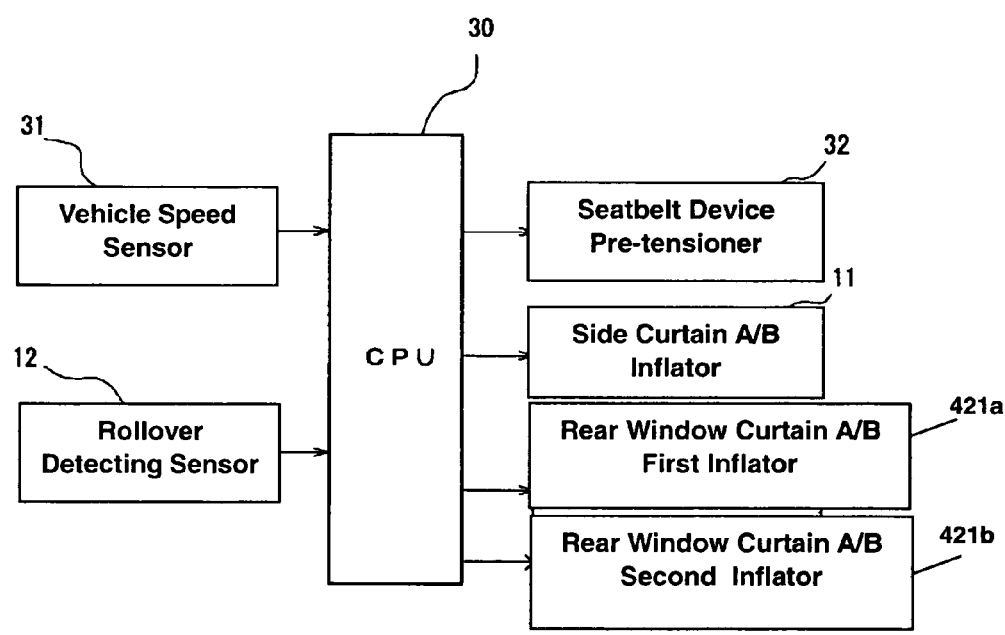
FIG. 28 is a control block diagram of the present embodiment.

FIG. 28 shows the control block of the present embodiment. This is substantially the same as that in the previous embodiments. However, the first and second inflators 421a, 421b for the rear window curtain airbag device are connected to the CPU 30 respectively.

Figure 29:
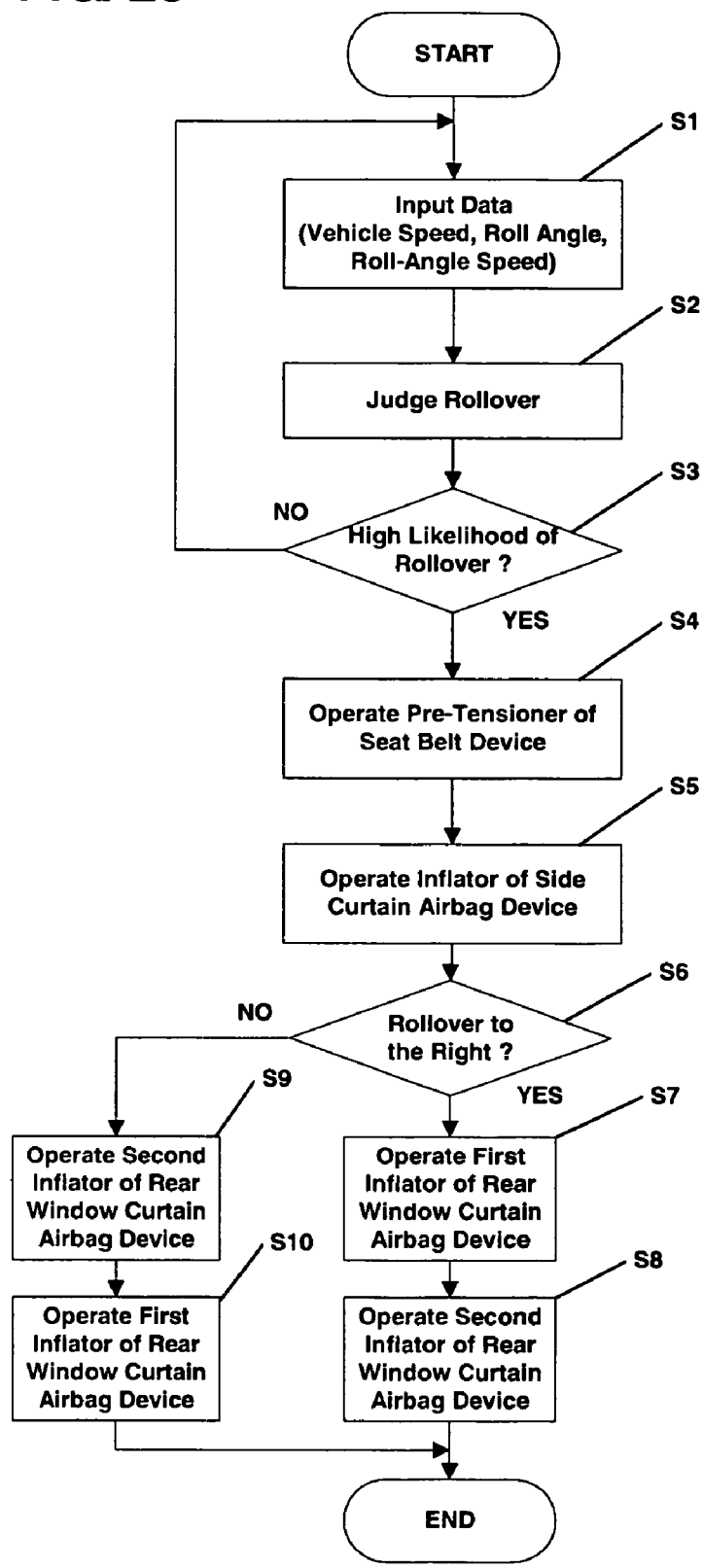
FIG. 29 is a control flowchart of the present embodiment.

This control block is controlled by the control flow shown in FIG. 29. Steps S1 through S5 are the same as those in the control flow of the previous embodiments. Accordingly, the subsequent steps will be described below.

In step S6, it is determined based on the inputted vehicle speed, roll angle and roll-angle speed whether the vehicle is rolled over to the right or not. When it is determined that the vehicle is rolled over to the right (YES), the control sequence proceeds to step S7, where the first inflator 421a is ignited to inflate the first airbag portion 420a in the curtain shape inside the rear window 4.

Then, in step S8, the second inflator 421b is ignited at a certain point during 2 to 100 ms from the ignition of the first inflator 421a to inflate the second airbag portion 420b in the curtain shape inside the rear window 4. Herein, another sensor, such as a lateral G sensor, may be applied to detect that the vehicle is rolled over to the right.

Meanwhile, when it is determined that the vehicle is not rolled over to the right (NO), namely when the vehicle is rolled over to the left, the control sequence proceeds to step S9, where the first inflator 421b is ignited to inflate the second airbag portion 420b in the curtain shape inside the rear window 4.

Then, in step S10, the first inflator 421a is ignited at a certain point during 2 to 100 ms from the ignition of the second inflator 421b to inflate the first airbag portion 420a in the curtain shape inside the rear window 4. Herein, the time period of 2 to 100 ms can be changed properly according to the vehicle characteristics.

The control of the airbag device for rollover countermeasure of the vehicle is executed by the above-described control flow.

When the first and second airbag portions 420a, 420b are inflated respectively, either one is inflated when the other is under inflation or after the other's inflation is complete. Thereby, the inflation of the both airbag portions 420a, 420b can be prevented properly from being interfered with each other, so that the airbag portions 420a, 420b can be inflated surely and promptly. Namely, the interference problem of the both airbag portions that would be caused by the concurrent inflation can be avoided properly.

Further, since the rear window 4 has the curved window pane as described above, the distance between the passenger's head and the portion of the rear window 4 that is located at the lower side at the vehicle rollover becomes short as illustrated in FIG. 23. Herein, according to the present embodiment, the airbag located at this lower side (left-side airbag in FIG. 23) is inflated prior to the other (right-side airbag in the figure).

Thereby, the airbag located at this shorter distance can be inflated so as to be located quickly between the passenger's head and rear window. As a result, part of passenger's body can be prevented surely from getting out of the window.

The present invention is not limited to the above-described embodiments, and any other modifications and improvements can be applied.

For example, the present invention can be applied to a five-passenger vehicle with the rear seat for three passengers, or a two-passenger vehicle without rear seat. Also, the inflator may be a high-temperature type of inflator. The airbag is not limited to the one with the trapezoid shape or the triangle shape in the plan view, but airbags having other shapes, such as a rectangle shape, or a circular shape, corresponding to the rear window shape, can be adopted. Also, in the case where there is not enough inflation space of the airbag to provide the proper tension, an additional tensioner device may be added for providing the proper tension. Also, the first and second airbag portions 420a, 420b may be started to be inflated at the same time.

What is claimed is:

1. An airbag device for rollover countermeasure of a vehicle, in which a rear window is disposed so as to slant gently and thereby be substantially located above a seat back in a use position of a rear seat that is disposed in a cabin in such a manner that an upper edge of the rear window is located in front of an upper end of the seat back in the use position of the rear seat, comprising:

a rollover judging device operative to judge a vehicle rollover by detecting or predicting the vehicle rollover; and an inflatable airbag, the airbag being placed at a portion near the upper edge of the rear window so as to extend at least in a vehicle width direction in a folded state thereof, wherein said airbag is configured so as to be inflated toward a vehicle rear along the rear window in a curtain shape from the portion near the upper edge of the rear window so as to cover at least a front-half portion of the rear window from the upper edge of the rear window, beyond a position of the rear window that is located right above the upper end of the seat back in the use position of the rear seat, to a position of the rear window that is located behind the upper end of the seat back in the use position of the rear seat when the vehicle rollover is judged by said rollover judging device.

2. The airbag device for rollover countermeasure of a vehicle of claim 1, wherein said airbag comprises an attaching portion at both sides thereof in the vehicle width direction that attaches the both sides of airbag to a portion near both side edges of the rear window.

3. The airbag device for rollover countermeasure of a vehicle of claim 1, wherein said airbag comprises an attaching portion at both sides thereof in the vehicle width direction that attaches the both sides of airbag to a portion near both side edges of the rear window, and an inflating portion to be inflated by supply gas, the inflating portion is comprised of a plurality of parts that extend downward from an upper end portion of the airbag so as to be located in the vehicle width direction, and a gas supply portion is provided at around the center of the upper end portion of the airbag.

4. The airbag device for rollover countermeasure of a vehicle of claim 1, wherein the vehicle is equipped with a seatbelt device comprising a tension applying device to apply a tension to a belt for restraining a torso of a passenger, and the tension applying device of the seatbelt device is configured so as to operate prior to an inflation of the airbag of said airbag device when the vehicle rollover is judged by the rollover judging device.

5. An airbag device for rollover countermeasure of a vehicle, in which a rear window is disposed so as to slant gently and thereby be substantially located above a seat back in a use position of a rear seat that is disposed in a cabin in such a manner that an upper edge of the rear window is located in front of an upper end of the seat back in the use position of the rear seat, comprising:

a rollover judging device operative to judge a vehicle rollover by detecting or predicting the vehicle rollover; and an inflatable airbag, the airbag being placed at a portion near the upper edge of the rear window so as to extend at least in a vehicle width direction in a folded state thereof, wherein said airbag is configured so as to be inflated toward a vehicle rear along the rear window in a curtain shape from the portion near the upper edge of the rear window so as to cover at least a front-half portion of the rear window from the upper edge of the rear window, beyond a position of the rear window that is located right above the upper end of the seat back in the use position of the rear seat, to a position of the rear window that is located behind the upper end of the seat back in the use position of the rear seat when the vehicle rollover is judged by said rollover judging device, said airbag comprises an attaching portion at both sides thereof in the vehicle width direction that attaches the both sides of airbag to a portion near both side edges of the rear window, and at least one inflating portion to be inflated by supply gas, and the inflating portion is configured such that when being inflated, a vertical-direction thickness of a portion thereof located behind the upper end of the seat back in the use position of the rear seat is smaller than that of a portion thereof located in front of the upper end of the seat back in the use position of the rear seat.

6. The airbag device for rollover countermeasure of a vehicle of claim 5, wherein said airbag comprises an attaching portion at both sides thereof in the vehicle width direction that attaches the both sides of airbag to a portion near both side edges of the rear window.

7. The airbag device for rollover countermeasure of a vehicle of claim 5, wherein said airbag comprises an attaching portion at both sides thereof in the vehicle width direction that attaches the both sides of airbag to a portion near both side edges of the rear window, and an inflating portion to be inflated by supply gas, the inflating portion is comprised of a plurality of parts that extend downward from an upper end portion of the airbag so as to be located in the vehicle width direction, and a gas supply portion is provided at around the center of the upper end portion of the airbag.

8. The airbag device for rollover countermeasure of a vehicle of claim 5, wherein the vehicle is equipped with a seatbelt device comprising a tension applying device to apply a tension to a belt for restraining a torso of a passenger, and the tension applying device of the seatbelt device is configured so as to operate prior to an inflation of the airbag of said airbag device when the vehicle rollover is judged by the rollover judging device.

9. An airbag device for rollover countermeasure of a vehicle, in which a rear window is disposed so as to slant gently and thereby be substantially located above a seat back in a use position of a rear seat that is disposed in a cabin in such a manner that an upper edge of the rear window is located in front of an upper end of the seat back in the use position of the rear seat, comprising:

a rollover judging device operative to judge a vehicle rollover by detecting or predicting the vehicle rollover; and an inflatable airbag, the airbag being placed at a portion near the upper edge of the rear window so as to extend at least in a vehicle width direction in a folded state thereof, wherein said airbag is configured so as to be inflated toward a vehicle rear along the rear window in a curtain shape from the portion near the upper edge of the rear window so as to cover at least a front-half portion of the rear window from the upper edge of the rear window, beyond a position of the rear window that is located right above the upper end of the seat back in the use position of the rear seat, to a position of the rear window that is located behind the upper end of the seat back in the use position of the rear seat when the vehicle rollover is judged by said rollover judging device, said airbag comprises an attaching portion at both sides thereof in the vehicle width direction that attaches the both sides of airbag to a portion near both side edges of the rear window, and at least one inflating portion to be inflated by supply gas, and at least a rear part of the inflating portion is configured such that when being inflated, a vertical-direction thickness of lateral side portions thereof corresponding to passenger-sitting positions is relatively small, whereas a vertical-direction thickness of a central portion thereof corresponding to the center of vehicle is relatively large.

10. The airbag device for rollover countermeasure of a vehicle of claim 9, wherein said airbag comprises an attaching portion at both sides thereof in the vehicle width direction that attaches the both sides of airbag to a portion near both side edges of the rear window.

11. The airbag device for rollover countermeasure of a vehicle of claim 9, wherein said airbag comprises an attaching portion at both sides thereof in the vehicle width direction that attaches the both sides of airbag to a portion near both side edges of the rear window, and an inflating portion to be inflated by supply gas, the inflating portion is comprised of a plurality of parts that extend downward from an upper end portion of the airbag so as to be located in the vehicle width direction, and a gas supply portion is provided at around the center of the upper end portion of the airbag.

12. The airbag device for rollover countermeasure of a vehicle of claim 9, wherein the vehicle is equipped with a seatbelt device comprising a tension applying device to apply a tension to a belt for restraining a torso of a passenger, and the tension applying device of the seatbelt device is configured so as to operate prior to an inflation of the airbag of said airbag device when the vehicle rollover is judged by the rollover judging device.

* * * * *